US011870617B2

(12) United States Patent
Abotabl et al.

(10) Patent No.: US 11,870,617 B2
(45) Date of Patent: Jan. 9, 2024

(54) MULTILEVEL CODING FOR PHYSICAL LAYER SECURITY

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 94 days.

(21) Appl. No.: 17/476,445

(22) Filed: Sep. 15, 2021

(65) Prior Publication Data

US 2023/0078989 A1 Mar. 16, 2023

(51) Int. Cl.
*H04L 25/49* (2006.01)
*H04W 72/23* (2023.01)

(52) U.S. Cl.
CPC ......... *H04L 25/4917* (2013.01); *H04W 72/23* (2023.01)

(58) Field of Classification Search
CPC ........................... H04L 25/4917; H04W 72/23
See application file for complete search history.

(56) References Cited

U.S. PATENT DOCUMENTS

| 2004/0042510 | A1* | 3/2004  | Bremer  | H04L 5/16    |
| 2006/0182274 | A1* | 8/2006  | Nicolai | H04N 21/23897 |
| 2013/0265993 | A1* | 10/2013 | Sun     | H04W 72/044  |
| 2016/0043848 | A1* | 2/2016  | Kim     | H04L 5/0016  |
| 2016/0119940 | A1* | 4/2016  | Wang    | H04L 1/1896  |
| 2019/0174305 | A1* | 6/2019  | Liang   | H04W 12/73   |
| 2022/0309194 | A1* | 9/2022  | Muthiah | H04L 9/0618  |

* cited by examiner

*Primary Examiner* — Ronald B Abelson
(74) *Attorney, Agent, or Firm* — Holland & Hart LLP/Qualcomm Incorporated

(57) ABSTRACT

Methods, systems, and devices for wireless communications are described. In a multilevel encoding scheme, a transmitting device may divide a stream of information bits in a message into multiple substreams, and the transmitting device may input each substream to a different level of an encoder such that each substream is encoded separately. The transmitting device may also input excess bits to some levels of the encoder to add physical layer security to the message. To improve the chances that a receiving device is able to correctly decode the message, the receiving device may be configured to identify the levels at which the excess bits are encoded. Accordingly, the receiving device may be able to decode the information bits in the message and avoid attempting to decode the excess bits in the message as information bits.

30 Claims, 19 Drawing Sheets

MULTILEVEL CODING FOR PHYSICAL LAYER SECURITY

FIELD OF TECHNOLOGY

The following relates to wireless communications, including multilevel coding for physical layer security.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a transmitting device (e.g., a UE or a base station) may support multilevel coding for encoding data or control information for transmission to a receiving device (e.g., another UE or base station). In such systems, the transmitting device may add physical layer security to an encoded message to prevent eavesdroppers from accessing the data or control information in the message. Improved techniques for supporting multilevel coding with physical layer security may be desirable.

SUMMARY

The described techniques relate to improved methods, systems, devices, and apparatuses that support multilevel coding for physical layer security. In a multilevel coding scheme, a transmitting device may divide a stream of information bits in a message into multiple substreams, and the transmitting device may input each substream to a different level of an encoder such that each substream is encoded separately. The transmitting device may also input excess bits to some levels of the encoder to add physical layer security to the message. To improve the chances that a receiving device is able to correctly decode the message, the receiving device may be configured to identify the levels at which the excess bits are encoded. Accordingly, the receiving device may be able to decode the information bits in the message and avoid attempting to decode the excess bits in the message as information bits. In some cases, the receiving device may also be configured to decode excess bits in the message at one or more levels to aid in the decoding of the information bits in the message.

A method for wireless communication at a UE is described. The method may include receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, receiving the downlink message from the base station, the downlink message including the excess bits encoded at the first set of levels of the multilevel coding scheme and also including the information bits encoded at a second set of levels of the multilevel coding scheme, and decoding the information bits in the downlink message at the second set of levels of the multilevel coding scheme based on the control message indicating the first set of levels at which the excess bits in the downlink message are encoded.

An apparatus for wireless communication at a UE is described. The apparatus may include a processor, memory coupled with the processor, and instructions stored in the memory. The instructions may be executable by the processor to cause the apparatus to receive, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, receive the downlink message from the base station, the downlink message including the excess bits encoded at the first set of levels of the multilevel coding scheme and also including the information bits encoded at a second set of levels of the multilevel coding scheme, and decode the information bits in the downlink message at the second set of levels of the multilevel coding scheme based on the control message indicating the first set of levels at which the excess bits in the downlink message are encoded.

Another apparatus for wireless communication at a UE is described. The apparatus may include means for receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, means for receiving the downlink message from the base station, the downlink message including the excess bits encoded at the first set of levels of the multilevel coding scheme and also including the information bits encoded at a second set of levels of the multilevel coding scheme, and means for decoding the information bits in the downlink message at the second set of levels of the multilevel coding scheme based on the control message indicating the first set of levels at which the excess bits in the downlink message are encoded.

A non-transitory computer-readable medium storing code for wireless communication at a UE is described. The code may include instructions executable by a processor to receive, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, receive the downlink message from the base station, the downlink message including the excess bits encoded at the first set of levels of the multilevel coding scheme and also including the information bits encoded at a second set of levels of the multilevel coding scheme, and decode the information bits in the downlink message at the second set of levels of the multilevel coding scheme based on the control message indicating the first set of levels at which the excess bits in the downlink message are encoded.

Some examples of the method, apparatuses, and non-transitory computer-readable medium described herein may further include operations, features, means, or instructions for receiving an indication of one or more levels of the first set of levels, the one or more levels including at least a portion of the excess bits that the UE may be to decode and decoding the at least the portion of the excess bits at the one or more levels based on the indication of the one or more levels, where decoding the information bits may be based on decoding the at least the portion of the excess bits.

In some examples of the method, apparatuses, and non-transitory computer-readable medium described herein, receiving the indication of the one or more levels may include operations, features, means, or instructions for receiving a radio resource control message indicating the one or more levels including the at least the portion of the excess bits for the UE to decode.

In some examples of the method, apparatuses, and non-transitory computer-readable medium described herein, the one or more levels of the first set of levels including the at least the portion of the excess bits for the UE to decode may be based on a modulation and coding scheme used for the downlink message.

In some examples of the method, apparatuses, and non-transitory computer-readable medium described herein, receiving the indication of the one or more levels may include operations, features, means, or instructions for receiving a downlink control information message indicating the one or more levels including the at least the portion of the excess bits for the UE to decode.

In some examples of the method, apparatuses, and non-transitory computer-readable medium described herein, the excess bits in the downlink message provide physical layer security, and the physical layer security may be enabled based on a modulation and coding scheme used for the downlink message.

Some examples of the method, apparatuses, and non-transitory computer-readable medium described herein may further include operations, features, means, or instructions for identifying a seed for a random sequence used to generate the excess bits in the downlink message and generating the excess bits using the identified seed for the random sequence, where the excess bits include random bits, and where decoding the information bits may be based on generating the random bits.

In some examples of the method, apparatuses, and non-transitory computer-readable medium described herein, identifying the seed for the random sequence used to generate the excess bits in the downlink message may include operations, features, means, or instructions for receiving, from the base station, an indication of the seed for the random sequence used to generate the excess bits in the downlink message.

In some examples of the method, apparatuses, and non-transitory computer-readable medium described herein, receiving the control message may include operations, features, means, or instructions for receiving a radio resource control message indicating the first set of levels of the multilevel coding scheme at which the excess bits in the downlink message may be to be encoded.

In some examples of the method, apparatuses, and non-transitory computer-readable medium described herein, the first set of levels at which the excess bits in the downlink message may be to be encoded may be based on a modulation and coding scheme used for the downlink message.

In some examples of the method, apparatuses, and non-transitory computer-readable medium described herein, receiving the control message may include operations, features, means, or instructions for receiving a medium access control (MAC) control element (CE) indicating the first set of levels of the multilevel coding scheme at which the excess bits in the downlink message may be to be encoded.

In some examples of the method, apparatuses, and non-transitory computer-readable medium described herein, receiving the control message may include operations, features, means, or instructions for receiving a downlink control information message indicating the first set of levels of the multilevel coding scheme at which the excess bits in the downlink message may be to be encoded.

In some examples of the method, apparatuses, and non-transitory computer-readable medium described herein, receiving the downlink control information message may include operations, features, means, or instructions for receiving a bitmap in the downlink control information message indicating the first set of levels of the multilevel coding scheme at which the excess bits in the downlink message may be to be encoded, where a size of the bitmap may be equal to a quantity of levels of the multilevel coding scheme, and each bit in the bitmap indicates whether information bits or excess bits may be to be encoded at a corresponding level.

Some examples of the method, apparatuses, and non-transitory computer-readable medium described herein may further include operations, features, means, or instructions for receiving a radio resource control message indicating a set of multiple different sets of levels at which the excess bits may be to be encoded, where the downlink control information message indicates the first set of levels from among the set of multiple different sets of levels.

A method for wireless communication at a base station is described. The method may include transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, encoding the excess bits in the downlink message at the first set of levels of the multilevel coding scheme, encoding information bits in the downlink message at a second set of levels of the multilevel coding scheme, and transmitting, the downlink message to the UE, the downlink message including the excess bits encoded at the first set of levels and also including the information bits encoded at the second set of levels.

An apparatus for wireless communication at a base station is described. The apparatus may include a processor, memory coupled with the processor, and instructions stored in the memory. The instructions may be executable by the processor to cause the apparatus to transmit, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, encode the excess bits in the downlink message at the first set of levels of the multilevel coding scheme, encode information bits in the downlink message at a second set of levels of the multilevel coding scheme, and transmit, the downlink message to the UE, the downlink message including the excess bits encoded at the first set of levels and also including the information bits encoded at the second set of levels.

Another apparatus for wireless communication at a base station is described. The apparatus may include means for transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, means for encoding the excess bits in the downlink message at the first set of levels of the multilevel coding scheme, means for encoding information bits in the downlink message at a second set of levels of the multilevel coding scheme, and means for transmitting, the downlink message to the UE, the downlink message including the excess bits encoded at the first set of levels and also including the information bits encoded at the second set of levels.

A non-transitory computer-readable medium storing code for wireless communication at a base station is described. The code may include instructions executable by a processor to transmit, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message, encode the excess bits in the downlink message at the first set of levels of the multilevel coding scheme, encode information bits in the downlink message at a second set of levels of the multilevel coding scheme, and transmit, the downlink message to the UE, the downlink message including the excess bits encoded at the first set of levels and also including the information bits encoded at the second set of levels.

Some examples of the method, apparatuses, and non-transitory computer-readable medium described herein may further include operations, features, means, or instructions for transmitting an indication of one or more levels of the first set of levels, the one or more levels including at least a portion of the excess bits that the UE may be to decode.

In some examples of the method, apparatuses, and non-transitory computer-readable medium described herein, transmitting the indication of the one or more levels may include operations, features, means, or instructions for transmitting a radio resource control message indicating the one or more levels including the at least the portion of the excess bits for the UE to decode.

In some examples of the method, apparatuses, and non-transitory computer-readable medium described herein, the one or more levels of the first set of levels including the at least the portion of the excess bits for the UE to decode may be based on a modulation and coding scheme used for the downlink message.

In some examples of the method, apparatuses, and non-transitory computer-readable medium described herein, transmitting the indication of the one or more levels may include operations, features, means, or instructions for transmitting a downlink control information message indicating the one or more levels including the at least the portion of the excess bits for the UE to decode.

In some examples of the method, apparatuses, and non-transitory computer-readable medium described herein, the excess bits in the downlink message provide physical layer security, and the physical layer security may be enabled based on a modulation and coding scheme used for the downlink message.

Some examples of the method, apparatuses, and non-transitory computer-readable medium described herein may further include operations, features, means, or instructions for generating the excess bits such that the UE may be unable to regenerate the excess bits, where the excess bits include random bits.

Some examples of the method, apparatuses, and non-transitory computer-readable medium described herein may further include operations, features, means, or instructions for identifying a seed for a random sequence to use to generate the excess bits in the downlink message, generating the excess bits using the identified seed for the random sequence, where the excess bits include random bits, and transmitting, to the UE, an indication of the identified seed for the random sequence used to generate the excess bits in the downlink message.

In some examples of the method, apparatuses, and non-transitory computer-readable medium described herein, transmitting the control message may include operations, features, means, or instructions for transmitting a radio resource control message indicating the first set of levels of the multilevel coding scheme at which the excess bits in the downlink message may be to be encoded.

In some examples of the method, apparatuses, and non-transitory computer-readable medium described herein, the first set of levels at which the excess bits in the downlink message may be to be encoded may be based on a modulation and coding scheme used for the downlink message.

In some examples of the method, apparatuses, and non-transitory computer-readable medium described herein, transmitting the control message may include operations, features, means, or instructions for transmitting a medium access control (MAC) control element (CE) indicating the first set of levels of the multilevel coding scheme at which the excess bits in the downlink message may be to be encoded.

In some examples of the method, apparatuses, and non-transitory computer-readable medium described herein, transmitting the control message may include operations, features, means, or instructions for transmitting a downlink control information message indicating the first set of levels of the multilevel coding scheme at which the excess bits in the downlink message may be to be encoded.

In some examples of the method, apparatuses, and non-transitory computer-readable medium described herein, transmitting the downlink control information message may include operations, features, means, or instructions for transmitting a bitmap in the downlink control information message indicating the first set of levels of the multilevel coding scheme at which the excess bits in the downlink message may be to be encoded, where a size of the bitmap may be equal to a quantity of levels of the multilevel coding scheme, and each bit in the bitmap indicates whether information bits or excess bits may be to be encoded at a corresponding level.

Some examples of the method, apparatuses, and non-transitory computer-readable medium described herein may further include operations, features, means, or instructions for transmitting a radio resource control message indicating a set of multiple different sets of levels at which the excess bits may be to be encoded, where the downlink control information message indicates the first set of levels from among the set of multiple different sets of levels.

A method for wireless communication at a UE is described. The method may include receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message, encoding the excess bits in the uplink message at the first set of levels of the multilevel coding scheme, encoding information bits in the uplink message at a second set of levels of the multilevel coding scheme, and transmitting, the uplink message to the base station, the uplink message including the excess bits encoded at the first set of levels and also including the information bits encoded at the second set of levels.

An apparatus for wireless communication at a UE is described. The apparatus may include a processor, memory coupled with the processor, and instructions stored in the memory. The instructions may be executable by the processor to cause the apparatus to receive, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message, encode the excess bits in the uplink message at the first set of levels of the multilevel coding scheme, encode information bits in the uplink message at a second set of levels of the multilevel coding scheme, and transmit, the uplink message to the base station, the uplink message including the excess bits encoded at the first set of levels and also including the information bits encoded at the second set of levels.

Another apparatus for wireless communication at a UE is described. The apparatus may include means for receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message, means for encoding the excess bits in the uplink message at the first set of levels of the multilevel coding scheme, means for encoding information bits in the uplink message at a second set of levels of the multilevel coding scheme, and means for transmitting, the uplink message to the base station, the uplink message including the excess bits encoded at the first set of levels and also including the information bits encoded at the second set of levels.

A non-transitory computer-readable medium storing code for wireless communication at a UE is described. The code may include instructions executable by a processor to receive, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message, encode the excess bits in the uplink message at the first set of levels of the multilevel coding scheme, encode information bits in the uplink message at a second set of levels of the multilevel coding scheme, and transmit, the uplink message to the base station, the uplink message including the excess bits encoded at the first set of levels and also including the information bits encoded at the second set of levels.

In some examples of the method, apparatuses, and non-transitory computer-readable medium described herein, the excess bits in the uplink message provide physical layer security, and the physical layer security may be enabled based on a modulation and coding scheme used for the uplink message.

Some examples of the method, apparatuses, and non-transitory computer-readable medium described herein may further include operations, features, means, or instructions for generating the excess bits such that the base station may be unable to regenerate the excess bits, where the excess bits include random bits.

Some examples of the method, apparatuses, and non-transitory computer-readable medium described herein may further include operations, features, means, or instructions for identifying a seed for a random sequence to use to generate the excess bits in the uplink message, generating the excess bits using the identified seed for the random sequence, where the excess bits include random bits, and transmitting, to the base station, an indication of the identified seed for the random sequence used to generate the excess bits in the uplink message.

In some examples of the method, apparatuses, and non-transitory computer-readable medium described herein, receiving the control message may include operations, features, means, or instructions for receiving a radio resource control message indicating the first set of levels of the multilevel coding scheme at which to encode the excess bits in the uplink message.

In some examples of the method, apparatuses, and non-transitory computer-readable medium described herein, the first set of levels at which to encode the excess bits in the uplink message may be based on a modulation and coding scheme used for the uplink message.

In some examples of the method, apparatuses, and non-transitory computer-readable medium described herein, receiving the control message may include operations, features, means, or instructions for receiving a medium access control (MAC) control element (CE) indicating the first set of levels of the multilevel coding scheme at which to encode the excess bits in the uplink message.

In some examples of the method, apparatuses, and non-transitory computer-readable medium described herein, receiving the control message may include operations, features, means, or instructions for receiving a downlink control information message indicating the first set of levels of the multilevel coding scheme at which to encode the excess bits in the uplink message.

In some examples of the method, apparatuses, and non-transitory computer-readable medium described herein, receiving the downlink control information message may include operations, features, means, or instructions for receiving a bitmap in the downlink control information message indicating the first set of levels of the multilevel coding scheme at which to encode the excess bits in the uplink message, where a size of the bitmap may be equal to a quantity of levels of the multilevel coding scheme, and each bit in the bitmap indicates whether information bits or excess bits may be to be encoded at a corresponding level.

Some examples of the method, apparatuses, and non-transitory computer-readable medium described herein may further include operations, features, means, or instructions for receiving a radio resource control message indicating a set of multiple different sets of levels at which to encode the excess bits, where the downlink control information message indicates the first set of levels from among the set of multiple different sets of levels.

A method for wireless communication at a base station is described. The method may include transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message, receiving, the uplink message from the UE, the uplink message including the excess bits encoded at the first set of levels of the multilevel coding scheme and also including the information bits encoded at a second set of levels of the multilevel coding scheme, and decoding the information bits in the uplink message at the second set of levels of the multilevel coding scheme based on the control message indicating the first set of levels at which to encode the excess bits in the uplink message.

An apparatus for wireless communication at a base station is described. The apparatus may include a processor, memory coupled with the processor, and instructions stored in the memory. The instructions may be executable by the processor to cause the apparatus to transmit, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message, receive, the uplink message from the UE, the uplink message including the excess bits encoded at the first set of levels of the multilevel coding scheme and also including the information bits encoded at a second set of levels of the multilevel coding scheme, and decode the information bits in the uplink message at the second set of levels of the multilevel coding scheme based on the control message indicating the first set of levels at which to encode the excess bits in the uplink message.

Another apparatus for wireless communication at a base station is described. The apparatus may include means for transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message, means for receiving, the uplink message from the UE, the uplink message including the excess bits encoded at the first set of levels of the multilevel coding scheme and also including the information bits encoded at a second set of levels of the multilevel coding scheme, and means for decoding the information bits in the uplink message at the second set of levels of the multilevel coding scheme based on the control message indicating the first set of levels at which to encode the excess bits in the uplink message.

A non-transitory computer-readable medium storing code for wireless communication at a base station is described. The code may include instructions executable by a processor to transmit, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message, receive, the uplink message from the UE, the uplink message including the excess bits encoded at the first set of levels of the multilevel coding scheme and also including the information bits encoded at a second set of levels of the multilevel coding scheme, and decode the information bits in the uplink message at the second set of levels of the multilevel coding scheme based on the control message indicating the first set of levels at which to encode the excess bits in the uplink message.

Some examples of the method, apparatuses, and non-transitory computer-readable medium described herein may further include operations, features, means, or instructions for decoding at least a portion of the excess bits at one or more levels of the first set of levels, where decoding the information bits may be based on decoding the at least the portion of the excess bits.

In some examples of the method, apparatuses, and non-transitory computer-readable medium described herein, the excess bits in the uplink message provide physical layer security, and the physical layer security may be enabled based on a modulation and coding scheme used for the uplink message.

Some examples of the method, apparatuses, and non-transitory computer-readable medium described herein may further include operations, features, means, or instructions for identifying a seed for a random sequence used to generate the excess bits in the uplink message and generating the excess bits using the identified seed for the random sequence, where the excess bits include random bits, and where decoding the information bits may be based on generating the excess bits.

In some examples of the method, apparatuses, and non-transitory computer-readable medium described herein, identifying the seed for the random sequence used to generate the excess bits in the uplink message may include operations, features, means, or instructions for receiving, from the UE, an indication of the seed for the random sequence used to generate the excess bits in the uplink message.

In some examples of the method, apparatuses, and non-transitory computer-readable medium described herein, transmitting the control message may include operations, features, means, or instructions for transmitting a radio resource control message indicating the first set of levels of the multilevel coding scheme at which to encode the excess bits in the uplink message.

In some examples of the method, apparatuses, and non-transitory computer-readable medium described herein, the first set of levels at which to encode the excess bits in the uplink message may be based on a modulation and coding scheme used for the uplink message.

In some examples of the method, apparatuses, and non-transitory computer-readable medium described herein, transmitting the control message may include operations, features, means, or instructions for transmitting a medium access control (MAC) control element (CE) indicating the first set of levels of the multilevel coding scheme at which to encode the excess bits in the uplink message.

In some examples of the method, apparatuses, and non-transitory computer-readable medium described herein, transmitting the control message may include operations, features, means, or instructions for transmitting a downlink control information message indicating the first set of levels of the multilevel coding scheme at which to encode the excess bits in the uplink message.

In some examples of the method, apparatuses, and non-transitory computer-readable medium described herein, transmitting the downlink control information message may include operations, features, means, or instructions for transmitting a bitmap in the downlink control information message indicating the first set of levels of the multilevel coding scheme at which to encode the excess bits in the uplink message, where a size of the bitmap may be equal to a quantity of levels of the multilevel coding scheme, and each bit in the bitmap indicates whether information bits or excess bits may be to be encoded at a corresponding level.

Some examples of the method, apparatuses, and non-transitory computer-readable medium described herein may further include operations, features, means, or instructions for transmitting a radio resource control message indicating a set of multiple different sets of levels at which to encode the excess bits, where the downlink control information message indicates the first set of levels from among the set of multiple different sets of levels.

DETAILED DESCRIPTION

In some wireless communications systems, a transmitting device (e.g., a user equipment (UE) or a base station) may support multilevel coding for encoding data or control information for transmission to a receiving device (e.g., another UE or base station). In a multilevel coding scheme, the transmitting device may divide a stream of information bits in a message into multiple substreams, and the transmitting device may input each substream to a different level of an encoder such that each substream is encoded separately. In some cases, the transmitting device may also input excess bits to some levels of the encoder to add physical layer security to the message. The excess bits may add noise to the message and prevent eavesdroppers from accessing the data or control information in the message. In such cases, however, it may be challenging for the receiving device to correctly decode the message if the message includes excess bits encoded at one or more levels. For instance, it may be challenging for the receiving device to differentiate between information bits and excess bits in the message.

As described herein, a wireless communications system may support efficient techniques to facilitate multilevel coding with physical layer security. In particular, to improve the chances that a receiving device is able to correctly decode a message encoded at a multilevel encoder with physical layer security, the receiving device may be configured to identify the levels at which the excess bits are encoded. Accordingly, the receiving device may be able to decode information bits in the message and avoid attempting to decode the excess bits in the message as information bits. That is, the receiving device may be able to differentiate between levels including information bits and levels including excess bits in a multilevel coding scheme. In some cases, the receiving device may also be configured to decode excess bits in the message at one or more levels to aid in the decoding of the information bits in the message.

Aspects of the disclosure are initially described in the context of wireless communications systems. Examples of processes and signaling exchanges that support multilevel coding for physical layer security are then described. Aspects of the disclosure are further illustrated by and described with reference to apparatus diagrams, system diagrams, and flowcharts that relate to multilevel coding for physical layer security.

Figure 1:
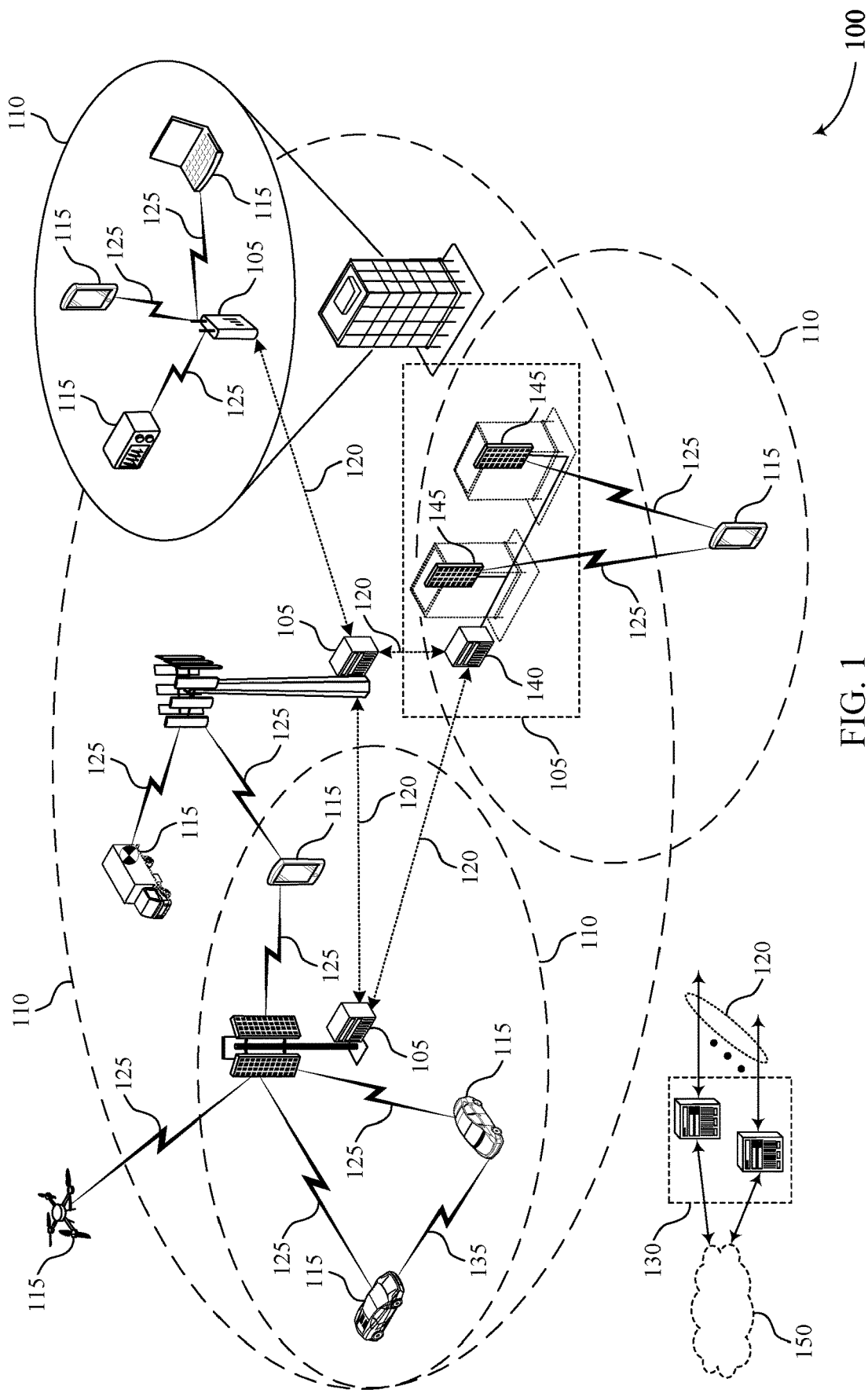
FIG. 1 illustrates an example of a wireless communications system that supports multilevel coding for physical layer security in accordance with aspects of the present disclosure.

FIG. 1 illustrates an example of a wireless communications system 100 that supports multilevel coding for physical layer security in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a transmitting device (e.g., a UE 115 or a base station 105) may support one or more techniques for processing data or control information in a message for transmission to a receiving device (e.g., another UE 115 or base station 105).

In one aspect, the transmitting device may utilize bit-interleaved coded modulation (BICM) for processing data or control information in a message. BICM may be a coded modulation technique used in NR. In BICM, information bits of the message may be encoded, interleaved, and then mapped to modulation symbols. The nature of BICM may provide equal error protection to all bits. However, not all bits may have the same channel conditions (e.g., different bits may have different capacities), and BICM may not be capacity achieving. For instance, the transmitting device may map a group of bits to a constellation point based on a modulation order, and each bit in the group of bits may have a different capacity (e.g., since channel conditions may be different for each bit in the group of bits). However, BICM may still provide equal protection to all bits in the group of bits.

In another aspect, the transmitting device may utilize multilevel coding for encoding data or control information in a message. In multilevel coding, information bits in a stream may be split into a number equal to a number of bits in each Constellation point, and each substream may be encoded independently. The multilevel coding architecture may provide flexibility in encoding each stream with a rate suitable to the capacity of the corresponding bit. For instance, if a modulation scheme used for modulating the message is 8 pulse amplitude modulation (8-PAM), a most significant bit (MSB) may be encoded with a higher rate than a least significant bit (e.g., where three bits are mapped to each modulation symbol). Thus, multilevel coding may provide different protection for different bits since these bits may be encoded separately. In some cases, messages encoded using multilevel coding may be either iteratively or jointly decoded by a receiving device.

Figure 2:
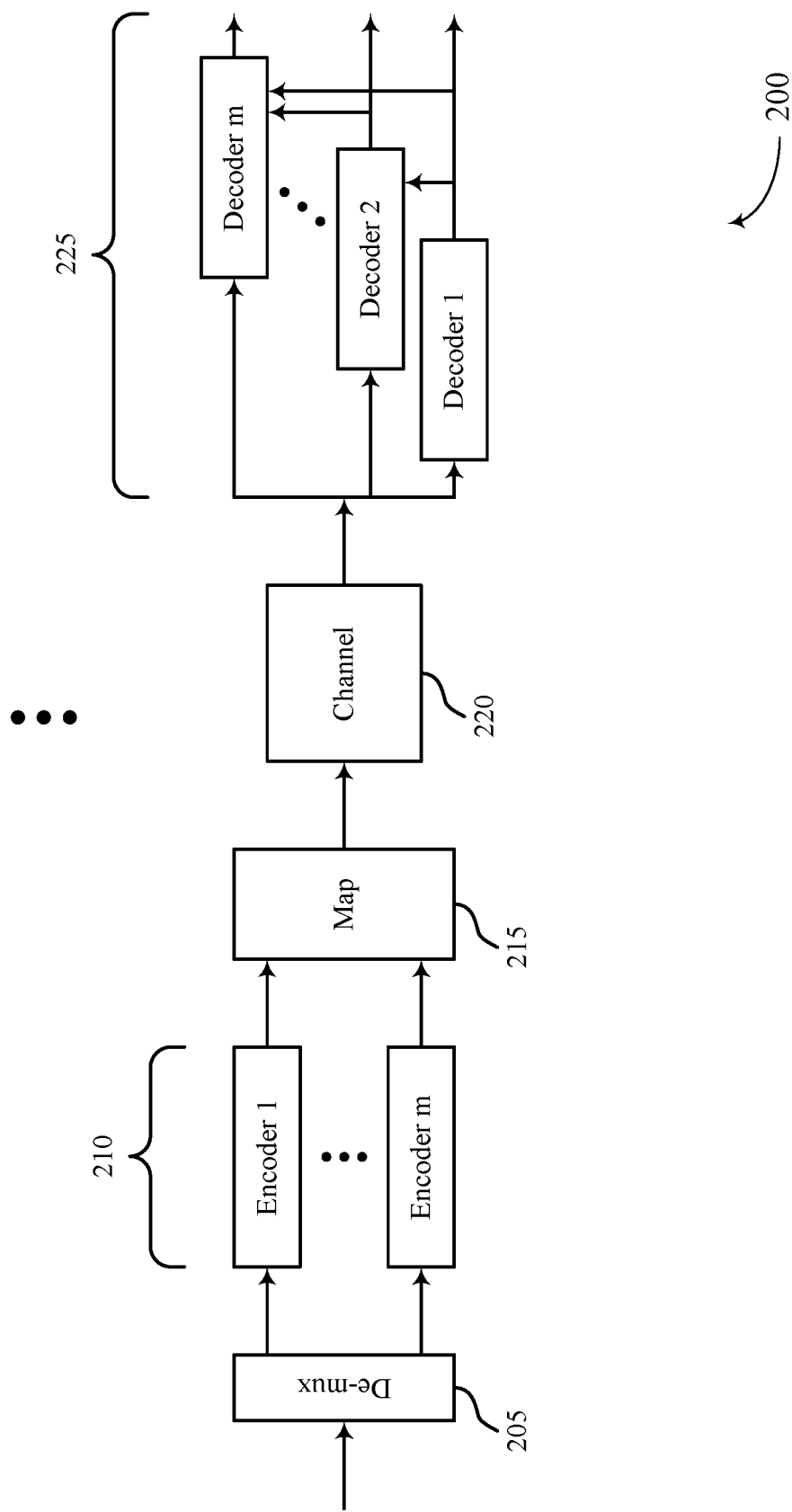
FIG. 2 illustrates an example of a multilevel coding scheme in accordance with aspects of the present disclosure.

FIG. 2 illustrates an example of a multilevel coding scheme 200 in accordance with aspects of the present disclosure. At 205, a transmitting device may demultiplex information bits of a message using a demultiplexer, and, at 210, the transmitting device may encode the information bits at multiple levels using a multilevel encoder (e.g., including multiple encoders). The transmitting device may then map the encoded information bits to constellation points using a mapper. The quantity of levels of the multilevel encoder may be equal to the quantity of bits mapped to each constellation point. Accordingly, the mapper may take one bit as input from each encoder or level of the multilevel encoder, and the mapper may map the bits to the constellation point. At 220, the transmitting device may transmit the message over a channel, and, at 225, a receiving device may receive and decode the message. For instance, the receiving device may decode each level of the message or decode the message at multiple levels using a multilevel decoder (e.g., including multiple decoders).

In some cases, when utilizing multilevel coding, it may be appropriate for a transmitting device to add security to a message. In such cases, the transmitting device may decide or be configured to add physical layer security to the message. Physical layer security may rely on filling an eavesdropper capacity with garbage so that the eavesdropper (e.g., Eve) receives zero information from the transmitting device (e.g., transmitter). The garbage may be in the form of randomness that the transmitting device sends with a code rate that fills the capacity of the eavesdropper (e.g., adversary) such that the eavesdropper fails in detecting any useful information from the transmitting device. Physical layer security (e.g., secrecy) may be different from encryption since physical layer security may be a physical layer procedure that exploits the statistics of the channel to hide information instead of relying on keys like in encryption. Encryption may be weak in certain areas especially when an eavesdropper or adversary is computationally capable. For instance, if the eavesdropper is able to identify keys used for encryption, the eavesdropper may be able to intercept, decrypt, and decode a message from the transmitting device. Encryption may also require extra processing at higher layers which may cause extra latency compared to physical layer security.

Figure 3:
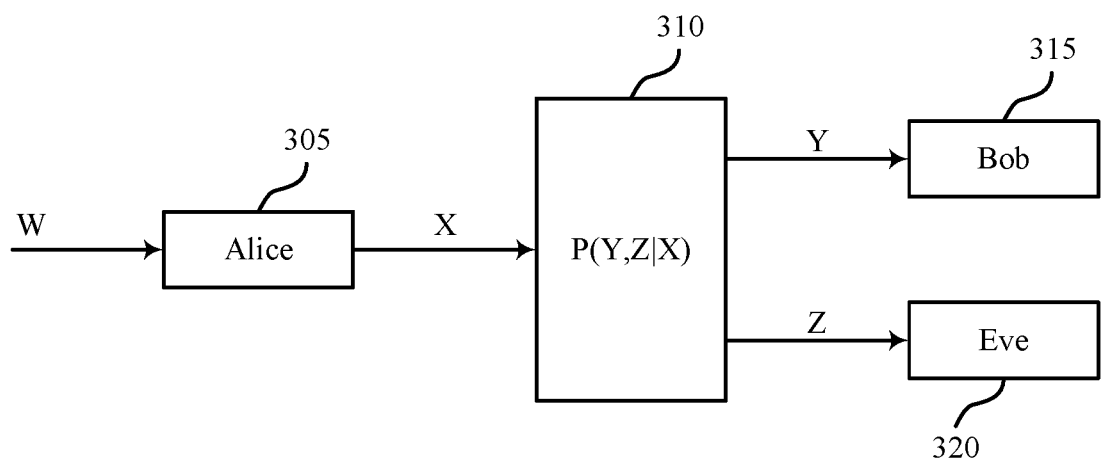
FIG. 3 illustrates an example of physical layer security in accordance with aspects of the present disclosure.

FIG. 3 illustrates an example of physical layer security 300 in accordance with aspects of the present disclosure. In the example of FIG. 3, a transmitting device 305 (e.g., Alice) may be scheduled to transmit a message to a receiving device 315 (e.g., Bob), and another receiving device or eavesdropper 320 (e.g., Eve) may attempt to intercept the message. Thus, to prevent the eavesdropper 320 from receiving and successfully decoding the message, the transmitting device 305 may add physical layer security 310 to the message. In particular, the transmitting device 305 may add excess bits to the message to provide the physical layer security 310. The excess bits may add noise to the message and prevent the eavesdropper 320 from accessing the data or control information in the message. That is, because a quality of a channel between the transmitting device 305 and the receiving device 315 may be good (e.g., compared to a channel between the transmitting device 305 and the eavesdropper 320), the receiving device 315 may be able to decode the message and the eavesdropper 320 may be unable to decode the message.

Figure 4:
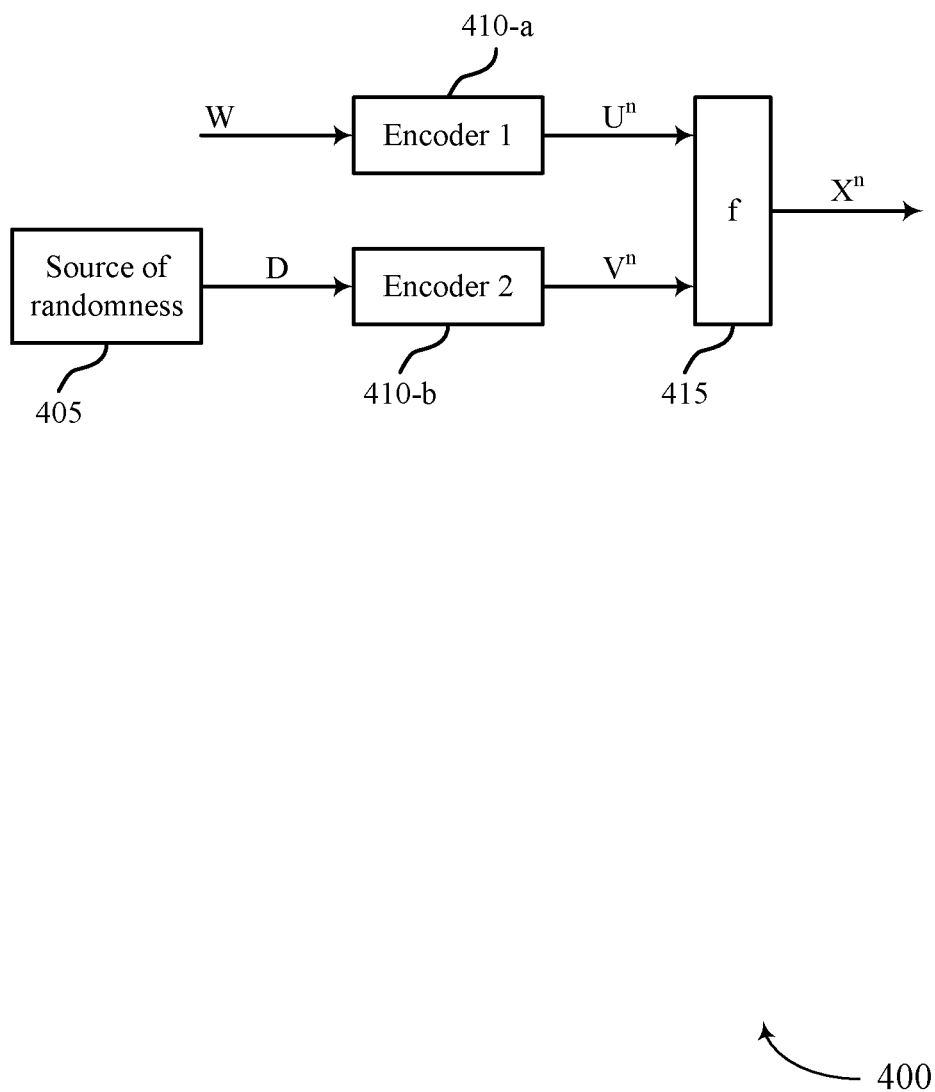
FIG. 4 illustrates an example of multilevel coding with physical layer security in accordance with aspects of the present disclosure.

FIG. 4 illustrates an example of multilevel coding with physical layer security 400 in accordance with aspects of the present disclosure. A transmitting device may input a stream or substream of information bits W to a first level of a multilevel encoder, and the transmitting device may input excess bits D to a second level of the multilevel encoder (e.g., from a source or randomness 405). The transmitting device may then encode the information bits W at the first level of the multilevel encoder or the first encoder 410-a, and the transmitting device may encode the excess bits at the second level of the multilevel encoder or the second encoder 410-b. The transmitting device may then combine the information bits and the excess bits using a function 415 (e.g., at a mapper), and the transmitting device may transmit a message with the information bits and the excess bits.

Because of the independent encoding process in multilevel encoding, the transmitting device may select a subset of the levels of a multilevel coding scheme to be filled with randomness. With proper configuration and a security priority, the transmitting device may successfully hide the useful information bits in the noise of the message from an eavesdropper. Further, in the case that the transmitting device is a UE 115, a network may avoid configuring the UE 115 with a random seed to generate the excess bits because the network may be able to either decode the intended message without decoding the randomness or decode the randomness before the intended message. In some cases, however, it may be challenging for a receiving device to correctly decode the message if the message includes excess bits encoded at one or more levels of a multilevel coding scheme. For instance, it may be challenging for the receiving device to differentiate between information bits and excess bits in the message.

Wireless communications system 100 may support efficient techniques for facilitating multilevel coding with physical layer security. For instance, wireless communications system 100 may regulate signaling of multilevel coding enabled secrecy.

Figure 5:
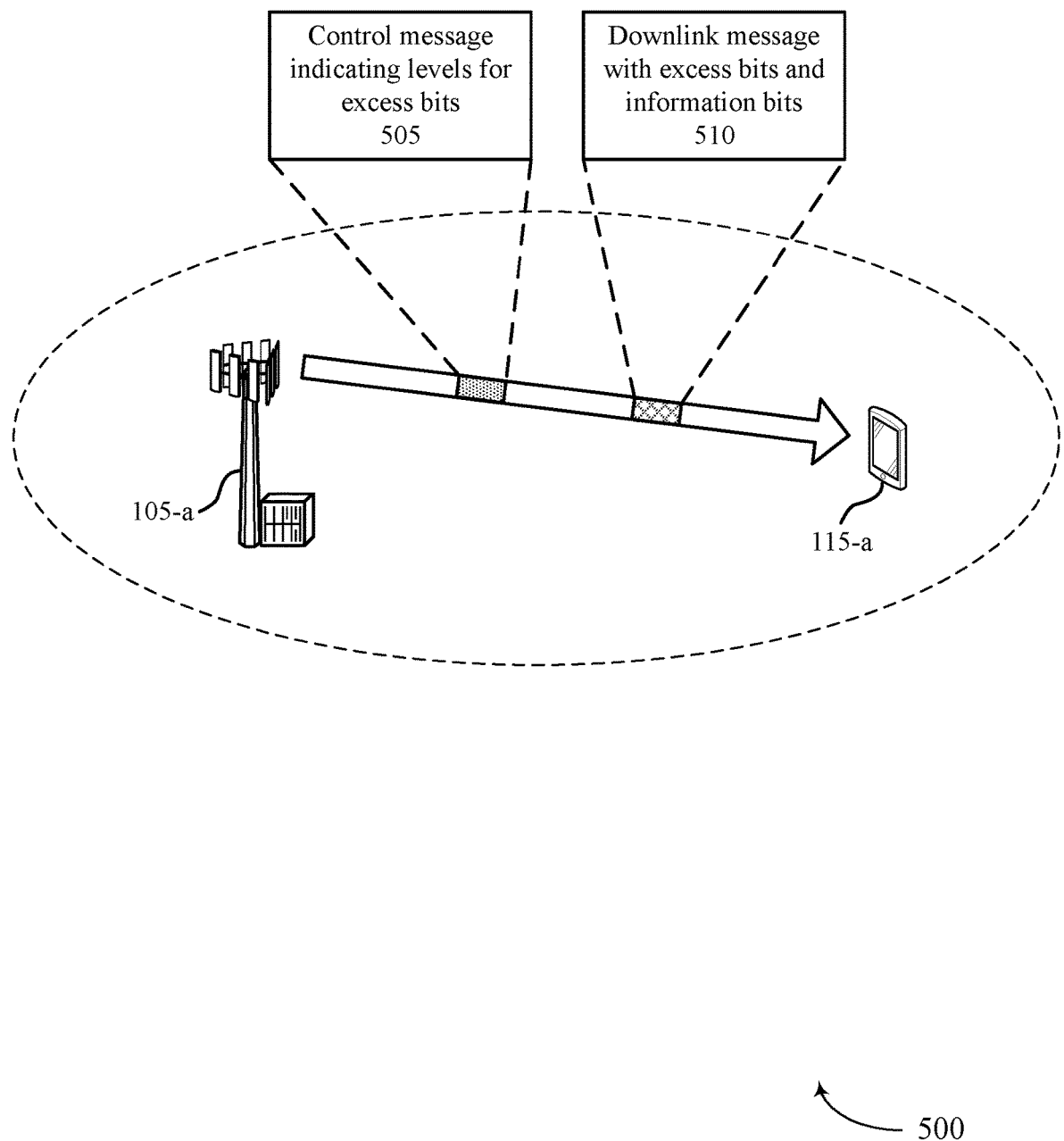
FIG. 5 illustrates an example of a wireless communications system that supports multilevel coding for physical layer security in accordance with aspects of the present disclosure.

FIG. 5 illustrates an example of a wireless communications system 500 that supports multilevel coding for physical layer security in accordance with aspects of the present disclosure. The wireless communications system 500 includes a UE 115-a, which may be an example of a UE 115 described with reference to FIGS. 1-4. The wireless communications system also includes a base station 105-a, which may be an example of a base station 105 described with reference to FIGS. 1-4. The wireless communications system 500 may implement aspects of the wireless communications system 100. For example, the wireless communications system 500 may support efficient techniques for facilitating multilevel coding with physical layer security. In some cases, a downlink transmission from the base station 105-a with multilevel encoding may be enabled with secrecy levels.

In the example of FIG. 5, a base station 105-a may transmit a control message 505 to a UE 115-a indicating levels of a multilevel coding scheme at which excess bits in a downlink message 510 are to be encoded at the base station 105-a. The levels at which the excess bits are to be encoded may be referred to as levels for secrecy or secrecy levels. Further, the secrecy levels may refer to a substream of bits encoded at an encoder or a level of a multilevel encoding scheme. The bits encoded at a secrecy level may be identified at the same level at a decoder at the UE 115-a (e.g., a receiving device).

The base station 105-a may indicate the secrecy levels to the UE 115-a since it may be appropriate for the UE 115-a to identify the levels from which randomness is transmitted. In some implementations, the base station 105-a may signal the secrecy levels in an RRC configuration that points out the levels (e.g., specific set of levels) used for secrecy based on a modulation and coding scheme (MCS). For instance, the secrecy levels may be different for different MCSs. In some examples, a column may be added to an MCS table that identifies which levels are to be used for secrecy. In some other implementations, the base station 105-*a* may signal the secrecy levels in a periodic or aperiodic manner in a MAC control element (MAC-CE).

In yet other implementations, the base station 105-*a* may signal the secrecy levels in a scheduling downlink control information (DCI). The scheduling DCI may refer to the DCI scheduling the downlink message including the excess bits encoded at the secrecy levels. The specific format of the DCI may be selected from one or more options. In one example, the base station 105-*a* may include a bitmap with the same size as the number of levels in the multilevel coding scheme in the DCI, and each bit in the bitmap may indicate whether a corresponding level includes excess bits (e.g., is a secrecy level) or includes information bits. For instance, a one in the bitmap may indicate that a corresponding level is a secrecy level and a zero in the bitmap may indicate that a corresponding level is not used for secrecy. In another example, the base station 105-*a* may include one or more bits in the DCI to select an option from an RRC configured set of options, and each option in the RRC configured set of options may indicate a different set of secrecy levels.

In addition to signaling the secrecy levels to the UE 115-*a*, the UE 115-*a* may also be informed of whether to attempt decoding the secrecy levels or not. In particular, the base station 105-*a* may transmit an indication to the UE 115-*a* of whether to decode the levels including excess bits in the downlink message 510. Additionally, or alternatively, the base station 105-*a* may indicate one or more secrecy levels for the UE 115-*a* to decode. That is, the base station 105-*a* may indicate to the UE 115-*a* which levels include excess bits to be decoded by the UE 115-*a*. The indication of whether to decode the secrecy levels or which secrecy levels to decode may depend on an achievable rate of each level and the levels chosen for data transmission (e.g., levels at which information bits are encoded).

Further, the signaling of whether to decode the secrecy levels or which secrecy levels to decode may be similar to the signaling of the secrecy levels. In some implementations, the base station 105-*a* may transmit an RRC configuration indicating whether to decode the secrecy levels or which secrecy levels to decode based on the MCS used for the downlink message 510. In some examples, a column may be added to an MCS table that identifies decodable levels (e.g., levels including excess bits to be decoded by the UE 115-*a*). In some other implementations, the base station 105-*a* may transmit DCI (e.g., scheduling DCI) with a joint encoding of the levels used for secrecy (e.g., secrecy levels) and the decodable levels. That is, the base station 105-*a* may jointly encode the indication of the levels at which excess bits are to be encoded and levels including excess bits to be decoded by the UE 115-*a*.

The base station 105-*a* may then transmit the downlink message 510 in a downlink transmission to the UE 115-*a*. In some cases, if more levels in the multilevel coding scheme are assigned for secrecy, an actual throughput may be reduced. Accordingly, the base station 105-*a* or the UE 115-*a* may be restricted to use multilevel coding with physical layer security (e.g., multilevel coding enabled secrecy) with certain modulation orders or MCSs. The restriction for using multilevel coding with physical layer security with certain modulation orders or MCSs may allow for a minimum throughput level to be attained.

Although FIG. 5 illustrates an example of multilevel coding for a downlink message 510 in a downlink transmission from the base station 105-*a* to the UE 115-*a*, it is to be understood that similar techniques may also be supported for multilevel coding for an uplink message in an uplink transmission from the UE 115-*a* to the base station 105-*a*. For instance, in addition to an uplink scheduling mechanism, the UE 115-*a* may be configured with levels used for transmission of randomness to provide physical layer security. The signaling mechanism may take a same approach as a downlink signaling mechanism. For instance, the base station 105-*a* may also transmit a control message to the UE 115-*a* (e.g., an RRC message, MAC-CE, or DCI message) indicating levels at which the UE 115-*a* is to encode excess bits in an uplink message.

The base station 105-*a* or the UE 115-*a* may support one or more techniques for generating the excess bits to include in the downlink message 510 or an uplink message, respectively, to provide physical layer security to the downlink message 510 or uplink message. In some aspects, the base station 105-*a* or the UE 115-*a* may generate a completely random sequence for the secrecy levels such that a receiving device may not be able to identify the random sequence or the excess bits in the downlink message 510 or the uplink message (e.g., the receiving device may be unable to regenerate the excess bits). In other aspects, the base station 105-*a* or the UE 115-*a* may generate a random sequence with a seed that is known at a receiving device (e.g., where the seed may change in a periodic or aperiodic manner). Providing the random sequence to a legitimate receiver may enable a higher transmission rate and more reliable transmission (e.g., since the receiving device may be more likely to decode the downlink message 510 or uplink message) at the cost of reduced security (e.g., since the knowledge of the random sequence seed at an adversary may enable the adversary to detect the information that is supposed to be secured).

Figure 6:
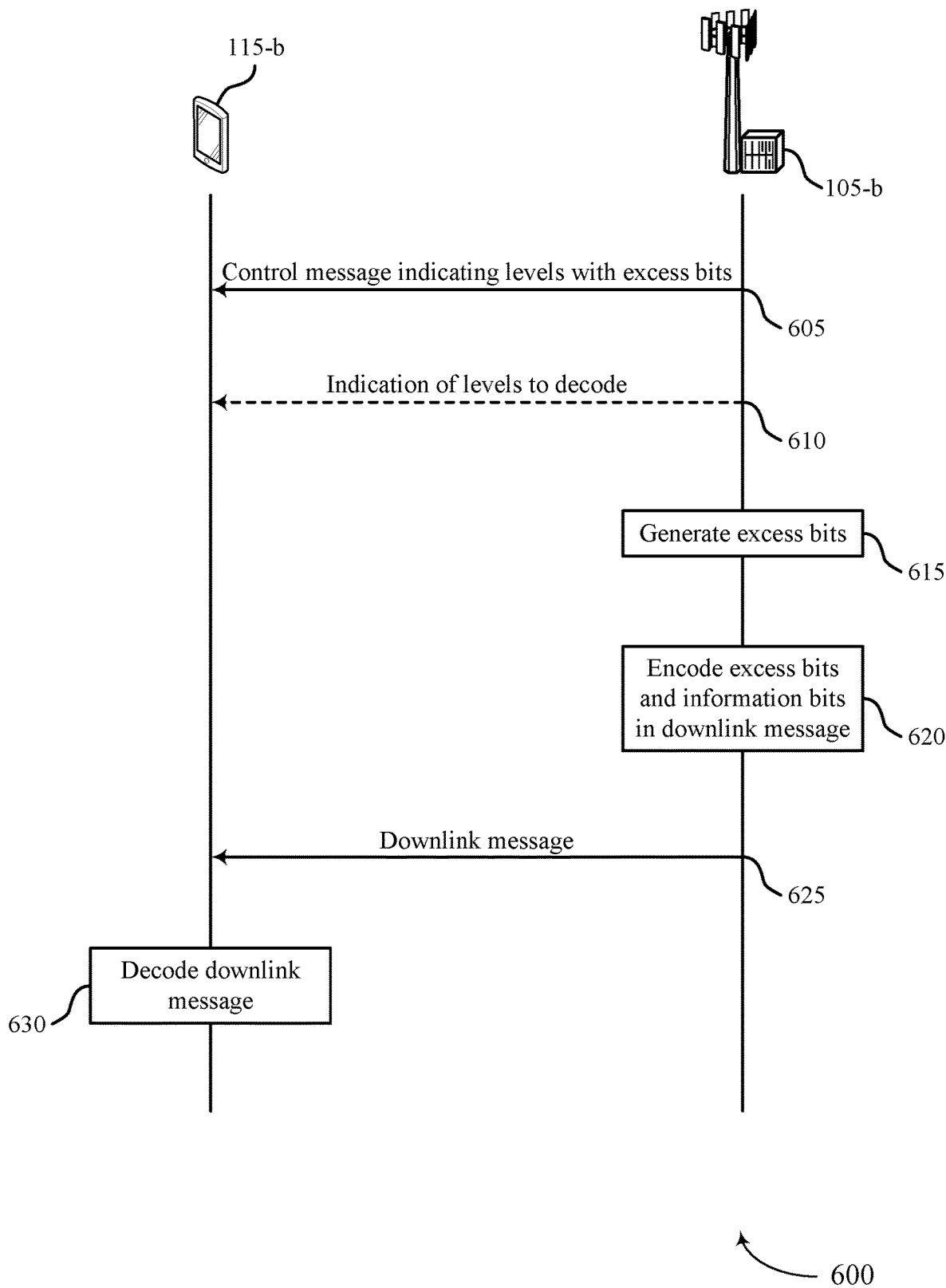
FIG. 6 illustrates an example of a process flow that supports multilevel coding for physical layer security in accordance with aspects of the present disclosure.

FIG. 6 illustrates an example of a process flow 600 that supports multilevel coding for physical layer security in accordance with aspects of the present disclosure. Process flow 600 includes UE 115-*b*, which may be an example of a UE 115 described with reference to FIGS. 1-5. Process flow 700 also includes base station 105-*b*, which may be an example of a base station 105 described with reference to FIGS. 1-5. The process flow 600 may implement aspects of wireless communications system 100 or the wireless communications system 500. For example, the process flow 600 may support efficient techniques for facilitating multilevel coding with physical layer security.

In the following description of the process flow 600, the signaling exchanged between UE 115-*b* and base station 105-*b* may be exchanged in a different order than the example order shown, or the operations performed by UE 115-*b* and base station 105-*b* may be performed in different orders or at different times. Some operations may also be omitted from the process flow 600, and other operations may be added to the process flow 600.

At 605, the base station 105-*b* may transmit, and the UE 115-*b* may receive, a control message indicating a first set of levels of a multilevel coding scheme at which excess bits in a downlink message are to be encoded. In some cases, different levels of the multilevel coding scheme represent separately encoded streams of bits, and the excess bits may be in addition to information bits of the downlink message. The excess bits in the downlink message may provide physical layer security, and the physical layer security may be enabled based on an MCS used for the downlink message.

In some cases, the base station 105-*b* may transmit, and the UE 115-*b* may receive, an RRC message indicating the first set of levels of the multilevel coding scheme at which the excess bits in the downlink message are to be encoded. The first set of levels at which the excess bits in the downlink message are to be encoded may be based on an MCS used for the downlink message. In other cases, the base station 105-*b* may transmit, and the UE 115-*b* may receive, a MAC-CE indicating the first set of levels of the multilevel coding scheme at which the excess bits in the downlink message are to be encoded.

In yet other cases, the base station 105-*b* may transmit, and the UE 115-*b* may receive, a DCI message indicating the first set of levels of the multilevel coding scheme at which the excess bits in the downlink message are to be encoded. In one example, the base station 105-*b* may transmit, and the UE 115-*b* may receive, a bitmap in the DCI message indicating the first set of levels of the multilevel coding scheme at which the excess bits in the downlink message are to be encoded. A size of the bitmap may be equal to a quantity of levels of the multilevel coding scheme, and each bit in the bitmap may indicate whether information bits or excess bits are to be encoded at a corresponding level. In another example, the base station 105-*b* may transmit, and the UE 115-*b* may receive, an RRC message indicating multiple different sets of levels at which the excess bits may be encoded, and the DCI message may indicate the first set of levels from among the multiple different sets of levels.

At 610, the base station 105-*b* may transmit, and the UE 115-*b* may receive, an indication of one or more levels of the first set of levels, where the one or more levels include at least a portion of the excess bits that the UE 115-*b* is to decode. In some cases, the base station 105-*b* may transmit, and the UE 115-*b* may receive, an RRC message indicating the one or more levels including the at least the portion of the excess bits for the UE to decode. The one or more levels of the first set of levels including the at least the portion of the excess bits for the UE 115-*b* to decode may be based on an MCS used for the downlink message. In other cases, the base station 105-*b* may transmit, and the UE 115-*b* may receive, a DCI message indicating the one or more levels including the at least the portion of the excess bits for the UE 115-*b* to decode.

At 615, the base station 105-*b* may generate the excess bits to include in the downlink message. The excess bits may also be referred to or may include random bits. In some cases, the base station 105-*b* may generate the excess bits such that the UE 115-*b* is unable to regenerate the excess bits. In other cases, the base station 105-*b* may identify a seed for a random sequence to use to generate the excess bits in the downlink message, and the base station 105-*b* may generate the excess bits using the identified seed for the random sequence. The base station 105-*b* may then transmit, and the UE 115-*b* may receive, an indication of the identified seed for the random sequence used to generate the excess bits in the downlink message.

At 620, the base station 105-*b* may encode the excess bits in the downlink message at the first set of levels of the multilevel coding scheme, and the base station 105-*b* may encode information bits in the downlink message at a second set of levels of the multilevel coding scheme. At 625, the base station 105-*b* may transmit, and the UE 115-*b* may receive, the downlink message including the excess bits encoded at the first set of levels of the multilevel coding scheme and also including the information bits encoded at the second set of levels of the multilevel coding scheme. At 630, the UE 115-*b* may decode the information bits in the downlink message at the second set of levels of the multilevel coding scheme based on the control message indicating the first set of levels at which the excess bits in the downlink message are encoded.

In some cases, the UE 115-*b* may decode at least the portion of the excess bits at the one or more levels based on the indication of the one or more levels received at 610. The UE 115-*b* may then decode the information bits in the downlink message based on decoding the at least the portion of the excess bits. In some cases, the UE 115-*b* may identify the seed for the random sequence used to generate the excess bits in the downlink message, and the UE 115-*b* may generate the excess bits using the identified seed for the random sequence. The UE 115-*b* may then decode the information bits in the downlink message based on generating the random bits. In some examples, the UE 115-*b* may receive the indication of the seed for the random sequence used to generate the excess bits in the downlink message.

Figure 7:
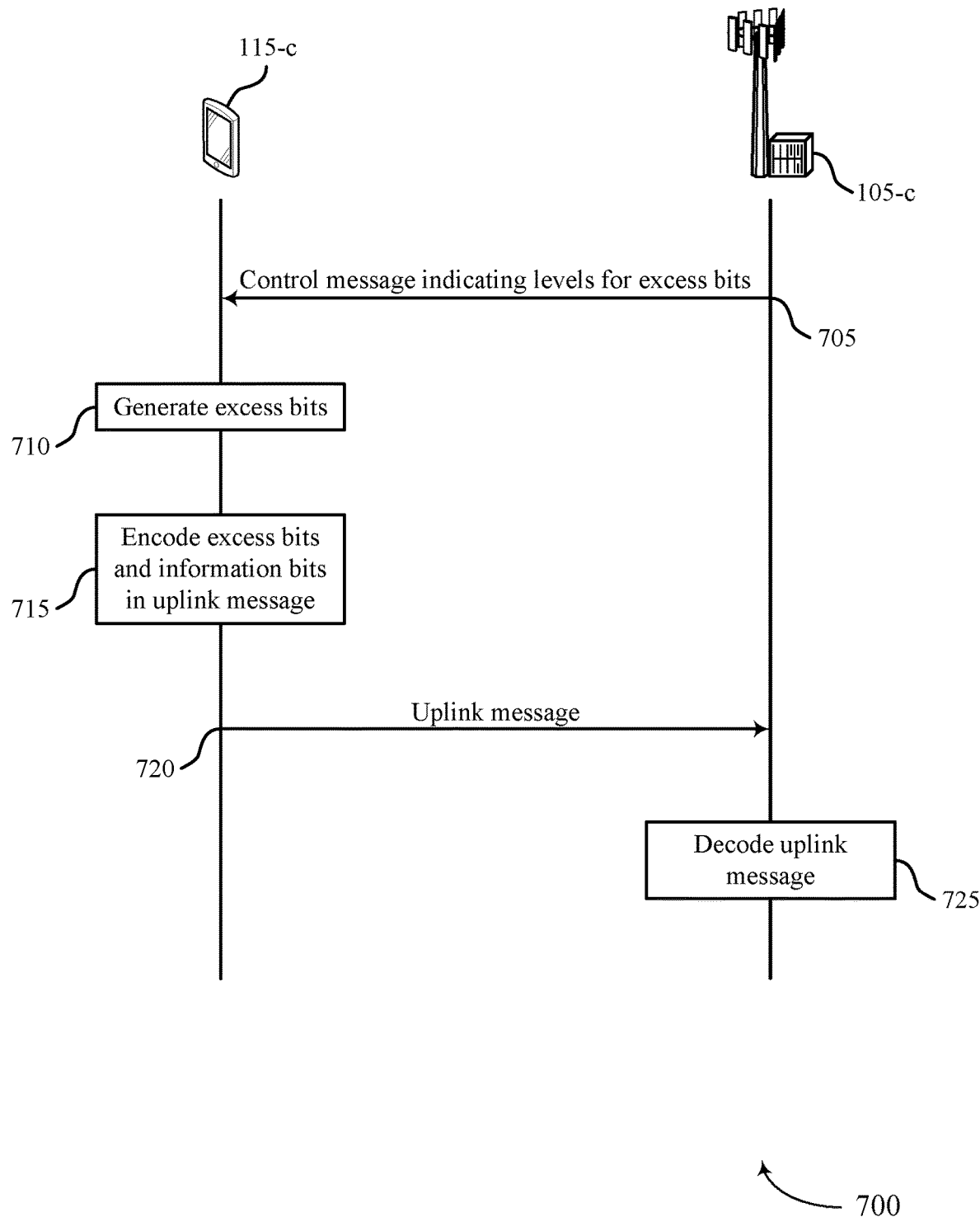
FIG. 7 illustrates an example of a process flow that supports multilevel coding for physical layer security in accordance with aspects of the present disclosure.

FIG. 7 illustrates an example of a process flow 700 that supports multilevel coding for physical layer security in accordance with aspects of the present disclosure. Process flow 700 includes UE 115-*c*, which may be an example of a UE 115 described with reference to FIGS. 1-6. Process flow 700 also includes base station 105-*c*, which may be an example of a base station 105 described with reference to FIGS. 1-6. The process flow 700 may implement aspects of the wireless communications system 100 or the wireless communications system 500. For example, the process flow 700 may support efficient techniques for facilitating multilevel coding with physical layer security.

In the following description of the process flow 700, the signaling exchanged between UE 115-*c* and base station 105-*c* may be exchanged in a different order than the example order shown, or the operations performed by UE 115-*c* and base station 105-*c* may be performed in different orders or at different times. Some operations may also be omitted from the process flow 700, and other operations may be added to the process flow 700.

At 705, the base station 105-*c* may transmit, and the UE 115-*c* may receive, a control message indicating a first set of levels of a multilevel coding scheme at which to encode excess bits in an uplink message. In some cases, different levels of the multilevel coding scheme represent separately encoded streams of bits, and the excess bits may be in addition to information bits of the uplink message. The excess bits in the uplink message may provide physical layer security, and the physical layer security may be enabled based on an MCS used for the uplink message.

In some cases, the base station 105-*c* may transmit, and the UE 115-*c* may receive, an RRC message indicating the first set of levels of the multilevel coding scheme at which to encode the excess bits in the uplink message. The first set of levels at which to encode the excess bits in the uplink message may be based on an MCS used for the uplink message. In other cases, the base station 105-*c* may transmit, and the UE 115-*c* may receive, a MAC-CE indicating the first set of levels of the multilevel coding scheme at which to encode the excess bits in the uplink message.

In yet other cases, the base station 105-*c* may transmit, and the UE 115-*c* may receive, a DCI message indicating the first set of levels of the multilevel coding scheme at which to encode the excess bits in the uplink message. In one example, the base station 105-*c* may transmit, and the UE 115-*c* may receive, a bitmap in the DCI message indicating the first set of levels of the multilevel coding scheme at which to encode the excess bits in the uplink message. A size of the bitmap may be equal to a quantity of levels of the multilevel coding scheme, and each bit in the bitmap may indicate whether information bits or excess bits are to be encoded at a corresponding level. In another example, the base station 105-c may transmit, and the UE 115-c may receive, an RRC message indicating multiple different sets of levels at which to encode the excess bits, and the DCI message may indicate the first set of levels from among the multiple different sets of levels.

At 710, the UE 115-c may generate the excess bits to include in the uplink message. The excess bits may also be referred to or may include random bits. In some cases, the UE 115-c may generate the excess bits such that the base station 105-c is unable to regenerate the excess bits. In other cases, the UE 115-c may identify a seed for a random sequence to use to generate the excess bits in the uplink message, and the UE 115-c may generate the excess bits using the identified seed for the random sequence. The UE 115-c may then transmit, and the base station 105-c may receive, an indication of the identified seed for the random sequence used to generate the excess bits in the uplink message.

At 715, the UE 115-c may encode the excess bits in the uplink message at the first set of levels of the multilevel coding scheme, and the UE 115-c may encode the information bits in the uplink message at a second set of levels of the multilevel coding scheme. At 720, the UE 115-c may transmit, and the base station 105-c may receive, the uplink message including the excess bits encoded at the first set of levels and also including the information bits encoded at the second set of levels. At 725, the base station 105-c may decode the information bits in the uplink message at the second set of levels of the multilevel coding scheme based on the control message indicating the first set of levels at which to encode the excess bits in the uplink message.

In some cases, the base station 105-c may decode at least a portion of the excess bits at one or more levels of the first set of levels. The base station 105-c may then decode the information bits in the uplink message based on decoding the at least the portion of the excess bits. In some cases, the base station 105-c may identify the seed for the random sequence used to generate the excess bits in the uplink message, and the base station 105-c may generate the excess bits using the identified seed for the random sequence. The base station 105-c may then decode the information bits in the downlink message based on generating the random bits. In some examples, the base station 105-c may receive the indication of the seed for the random sequence used to generate the excess bits in the downlink message.

Figure 8:
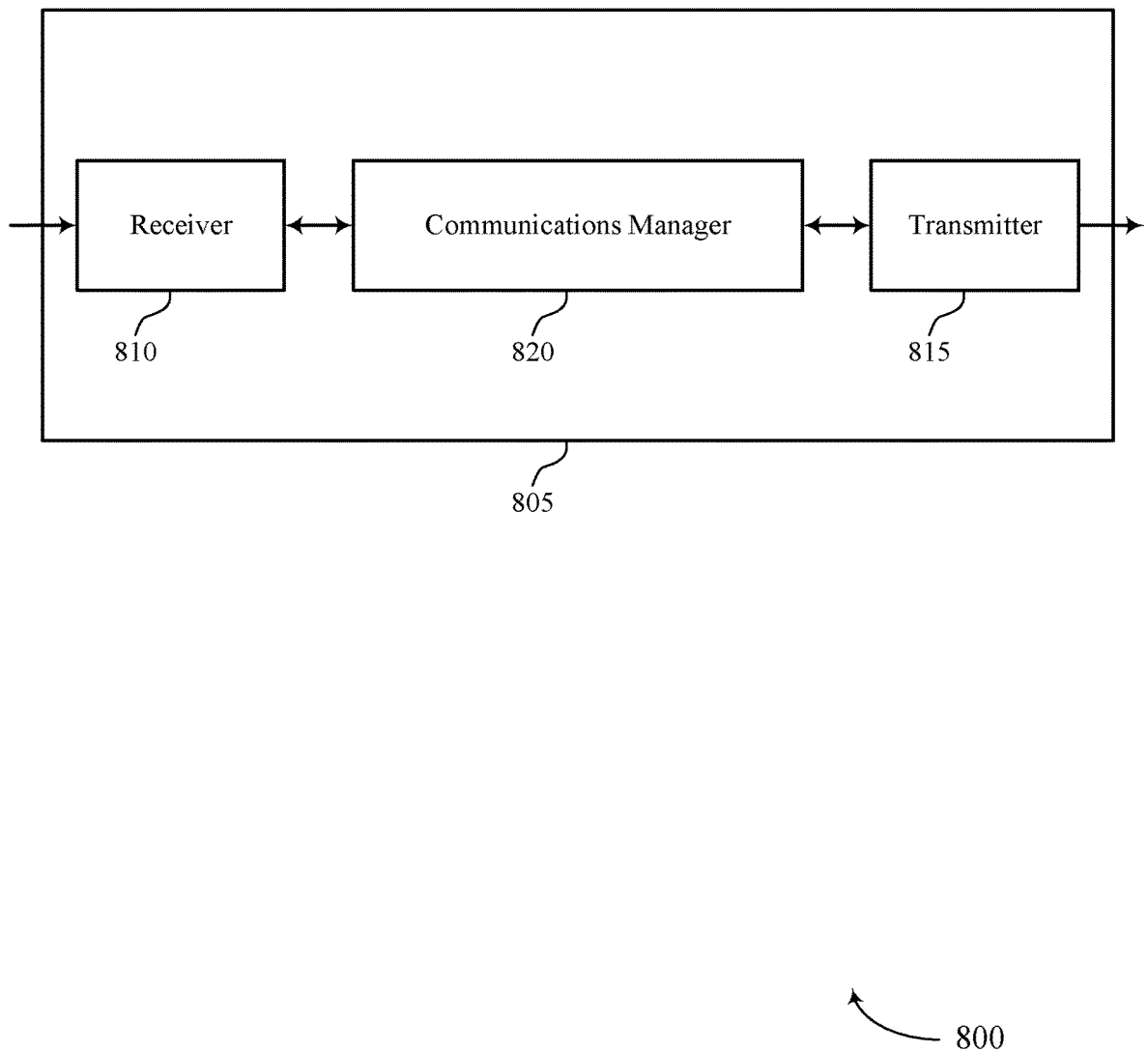
FIGS. 8 and 9 show block diagrams of devices that support multilevel coding for physical layer security in accordance with aspects of the present disclosure.

FIG. 8 shows a block diagram 800 of a device 805 that supports multilevel coding for physical layer security in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multilevel coding for physical layer security). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multilevel coding for physical layer security). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multilevel coding for physical layer security as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The communications manager 820 may be configured as or otherwise support a means for receiving the downlink message from the base station, the downlink message including the excess bits encoded at the first set of levels of the multilevel coding scheme and also including the information bits encoded at a second set of levels of the multilevel coding scheme. The communications manager 820 may be configured as or otherwise support a means for decoding the information bits in the downlink message at the second set of levels of the multilevel coding scheme based on the control message indicating the first set of levels at which the excess bits in the downlink message are encoded.

Additionally, or alternatively, the communications manager 820 may support wireless communication at a UE in accordance with examples as disclosed herein. For example, the communications manager 820 may be configured as or otherwise support a means for receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message. The communications manager 820 may be configured as or otherwise support a means for encoding the excess bits in the uplink message at the first set of levels of the multilevel coding scheme. The communications manager 820 may be configured as or otherwise support a means for encoding information bits in the uplink message at a second set of levels of the multilevel coding scheme. The communications manager 820 may be configured as or otherwise support a means for transmitting, the uplink message to the base station, the uplink message including the excess bits encoded at the first set of levels and also including the information bits encoded at the second set of levels.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and reduced power consumption at a receiving device. In particular, because the receiving device may be able to identify levels at which excess bits providing physical layer security are encoded in a message, the receiving device may be able to decode the message and identify the information bits in the message with minimal processing. The receiving device may also avoid having to receive retransmissions of the message since the receiving device may be more likely to successfully decode each transmission of the message.

Figure 9:
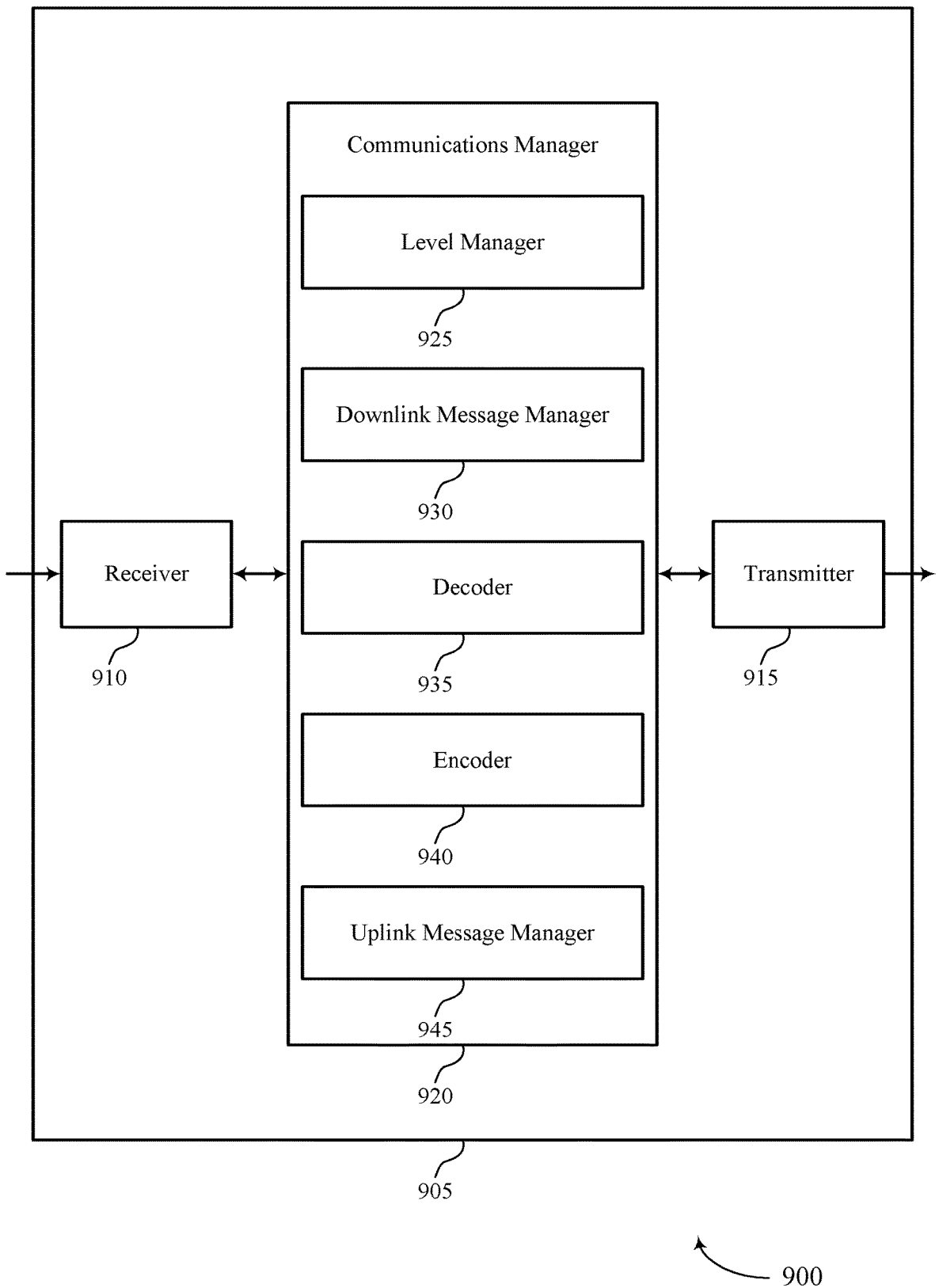

FIG. 9 shows a block diagram 900 of a device 905 that supports multilevel coding for physical layer security in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multilevel coding for physical layer security). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multilevel coding for physical layer security). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multilevel coding for physical layer security as described herein. For example, the communications manager 920 may include a level manager 925, a downlink message manager 930, a decoder 935, an encoder 940, an uplink message manager 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The level manager 925 may be configured as or otherwise support a means for receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The downlink message manager 930 may be configured as or otherwise support a means for receiving the downlink message from the base station, the downlink message including the excess bits encoded at the first set of levels of the multilevel coding scheme and also including the information bits encoded at a second set of levels of the multilevel coding scheme. The decoder 935 may be configured as or otherwise support a means for decoding the information bits in the downlink message at the second set of levels of the multilevel coding scheme based on the control message indicating the first set of levels at which the excess bits in the downlink message are encoded.

Additionally, or alternatively, the communications manager 920 may support wireless communication at a UE in accordance with examples as disclosed herein. The level manager 925 may be configured as or otherwise support a means for receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message. The encoder 940 may be configured as or otherwise support a means for encoding the excess bits in the uplink message at the first set of levels of the multilevel coding scheme. The encoder 940 may be configured as or otherwise support a means for encoding information bits in the uplink message at a second set of levels of the multilevel coding scheme. The uplink message manager 945 may be configured as or otherwise support a means for transmitting, the uplink message to the base station, the uplink message including the excess bits encoded at the first set of levels and also including the information bits encoded at the second set of levels.

Figure 10:
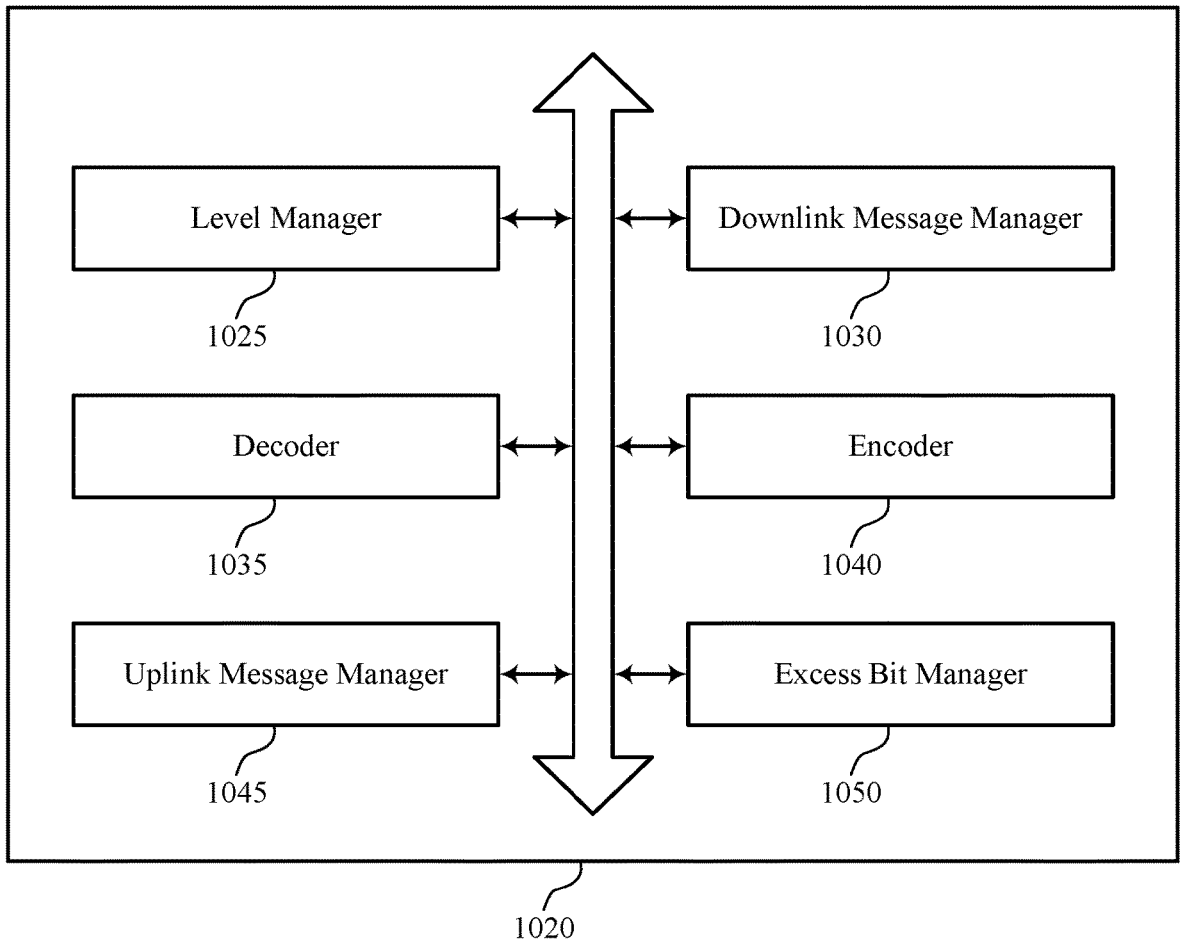
FIG. 10 shows a block diagram of a communications manager that supports multilevel coding for physical layer security in accordance with aspects of the present disclosure.

FIG. 10 shows a block diagram 1000 of a communications manager 1020 that supports multilevel coding for physical layer security in accordance with aspects of the present disclosure. The communications manager 1020 may be an example of aspects of a communications manager 820, a communications manager 920, or both, as described herein. The communications manager 1020, or various components thereof, may be an example of means for performing various aspects of multilevel coding for physical layer security as described herein. For example, the communications manager 1020 may include a level manager 1025, a downlink message manager 1030, a decoder 1035, an encoder 1040, an uplink message manager 1045, an excess bit manager 1050, or any combination thereof. Each of these components may communicate, directly or indirectly, with one another (e.g., via one or more buses).

The communications manager 1020 may support wireless communication at a UE in accordance with examples as disclosed herein. The level manager 1025 may be configured as or otherwise support a means for receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The downlink message manager 1030 may be configured as or otherwise support a means for receiving the downlink message from the base station, the downlink message including the excess bits encoded at the first set of levels of the multilevel coding scheme and also including the information bits encoded at a second set of levels of the multilevel coding scheme. The decoder 1035 may be configured as or otherwise support a means for decoding the information bits in the downlink message at the second set of levels of the multilevel coding scheme based on the control message indicating the first set of levels at which the excess bits in the downlink message are encoded.

In some examples, the excess bit manager 1050 may be configured as or otherwise support a means for receiving an indication of one or more levels of the first set of levels, the one or more levels including at least a portion of the excess bits that the UE is to decode. In some examples, the decoder 1035 may be configured as or otherwise support a means for decoding the at least the portion of the excess bits at the one or more levels based on the indication of the one or more levels, where decoding the information bits is based on decoding the at least the portion of the excess bits.

In some examples, to support receiving the indication of the one or more levels, the excess bit manager 1050 may be configured as or otherwise support a means for receiving a radio resource control message indicating the one or more levels including the at least the portion of the excess bits for the UE to decode.

In some examples, the one or more levels of the first set of levels including the at least the portion of the excess bits for the UE to decode are based on a modulation and coding scheme used for the downlink message.

In some examples, to support receiving the indication of the one or more levels, the excess bit manager 1050 may be configured as or otherwise support a means for receiving a downlink control information message indicating the one or more levels including the at least the portion of the excess bits for the UE to decode.

In some examples, the excess bits in the downlink message provide physical layer security, and the physical layer security is enabled based on a modulation and coding scheme used for the downlink message.

In some examples, the excess bit manager 1050 may be configured as or otherwise support a means for identifying a seed for a random sequence used to generate the excess bits in the downlink message. In some examples, the excess bit manager 1050 may be configured as or otherwise support a means for generating the excess bits using the identified seed for the random sequence, where the excess bits include random bits, and where decoding the information bits is based on generating the random bits.

In some examples, to support identifying the seed for the random sequence used to generate the excess bits in the downlink message, the excess bit manager 1050 may be configured as or otherwise support a means for receiving, from the base station, an indication of the seed for the random sequence used to generate the excess bits in the downlink message.

In some examples, to support receiving the control message, the level manager 1025 may be configured as or otherwise support a means for receiving a radio resource control message indicating the first set of levels of the multilevel coding scheme at which the excess bits in the downlink message are to be encoded.

In some examples, the first set of levels at which the excess bits in the downlink message are to be encoded is based on a modulation and coding scheme used for the downlink message.

In some examples, to support receiving the control message, the level manager 1025 may be configured as or otherwise support a means for receiving a medium access control (MAC) control element (CE) indicating the first set of levels of the multilevel coding scheme at which the excess bits in the downlink message are to be encoded.

In some examples, to support receiving the control message, the level manager 1025 may be configured as or otherwise support a means for receiving a downlink control information message indicating the first set of levels of the multilevel coding scheme at which the excess bits in the downlink message are to be encoded.

In some examples, to support receiving the downlink control information message, the level manager 1025 may be configured as or otherwise support a means for receiving a bitmap in the downlink control information message indicating the first set of levels of the multilevel coding scheme at which the excess bits in the downlink message are to be encoded, where a size of the bitmap is equal to a quantity of levels of the multilevel coding scheme, and each bit in the bitmap indicates whether information bits or excess bits are to be encoded at a corresponding level.

In some examples, the level manager 1025 may be configured as or otherwise support a means for receiving a radio resource control message indicating a set of multiple different sets of levels at which the excess bits are to be encoded, where the downlink control information message indicates the first set of levels from among the set of multiple different sets of levels.

Additionally, or alternatively, the communications manager 1020 may support wireless communication at a UE in accordance with examples as disclosed herein. In some examples, the level manager 1025 may be configured as or otherwise support a means for receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message. The encoder 1040 may be configured as or otherwise support a means for encoding the excess bits in the uplink message at the first set of levels of the multilevel coding scheme. In some examples, the encoder 1040 may be configured as or otherwise support a means for encoding information bits in the uplink message at a second set of levels of the multilevel coding scheme. The uplink message manager 1045 may be configured as or otherwise support a means for transmitting, the uplink message to the base station, the uplink message including the excess bits encoded at the first set of levels and also including the information bits encoded at the second set of levels.

In some examples, the excess bits in the uplink message provide physical layer security, and the physical layer security is enabled based on a modulation and coding scheme used for the uplink message.

In some examples, the excess bit manager 1050 may be configured as or otherwise support a means for generating the excess bits such that the base station is unable to regenerate the excess bits, where the excess bits include random bits.

In some examples, the excess bit manager 1050 may be configured as or otherwise support a means for identifying a seed for a random sequence to use to generate the excess bits in the uplink message. In some examples, the excess bit manager 1050 may be configured as or otherwise support a means for generating the excess bits using the identified seed for the random sequence, where the excess bits include random bits. In some examples, the excess bit manager 1050 may be configured as or otherwise support a means for transmitting, to the base station, an indication of the identified seed for the random sequence used to generate the excess bits in the uplink message.

In some examples, to support receiving the control message, the level manager 1025 may be configured as or otherwise support a means for receiving a radio resource control message indicating the first set of levels of the multilevel coding scheme at which to encode the excess bits in the uplink message.

In some examples, the first set of levels at which to encode the excess bits in the uplink message is based on a modulation and coding scheme used for the uplink message.

In some examples, to support receiving the control message, the level manager 1025 may be configured as or otherwise support a means for receiving a medium access control (MAC) control element (CE) indicating the first set of levels of the multilevel coding scheme at which to encode the excess bits in the uplink message.

In some examples, to support receiving the control message, the level manager 1025 may be configured as or otherwise support a means for receiving a downlink control information message indicating the first set of levels of the multilevel coding scheme at which to encode the excess bits in the uplink message.

In some examples, to support receiving the downlink control information message, the level manager 1025 may be configured as or otherwise support a means for receiving a bitmap in the downlink control information message indicating the first set of levels of the multilevel coding scheme at which to encode the excess bits in the uplink message, where a size of the bitmap is equal to a quantity of levels of the multilevel coding scheme, and each bit in the bitmap indicates whether information bits or excess bits are to be encoded at a corresponding level.

In some examples, the level manager 1025 may be configured as or otherwise support a means for receiving a radio resource control message indicating a set of different sets of levels at which to encode the excess bits, where the downlink control information message indicates the first set of levels from among the set of multiple different sets of levels.

Figure 11:
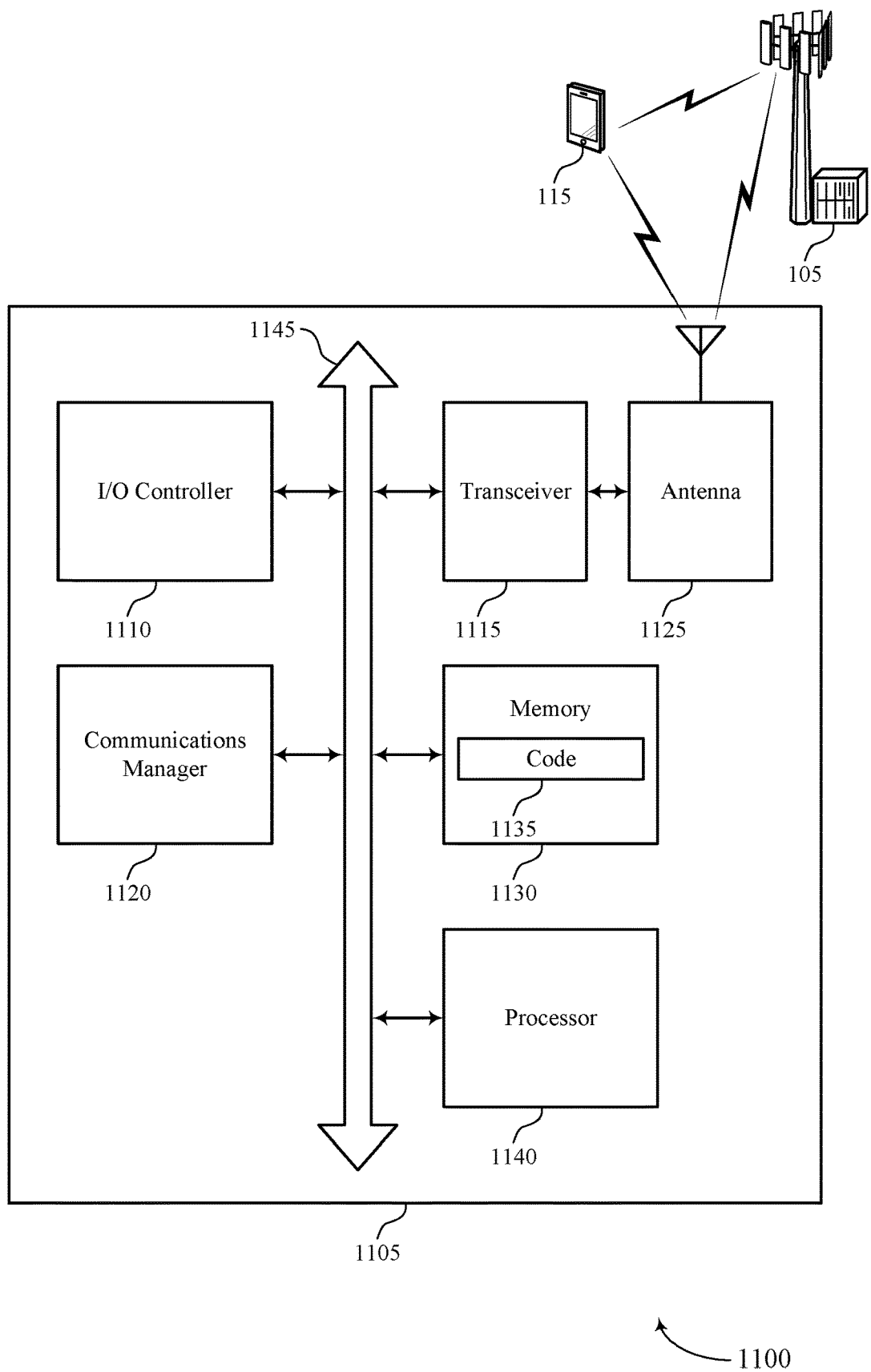
FIG. 11 shows a diagram of a system including a device that supports multilevel coding for physical layer security in accordance with aspects of the present disclosure.

FIG. 11 shows a diagram of a system 1100 including a device 1105 that supports multilevel coding for physical layer security in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multilevel coding for physical layer security). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The communications manager 1120 may be configured as or otherwise support a means for receiving the downlink message from the base station, the downlink message including the excess bits encoded at the first set of levels of the multilevel coding scheme and also including the information bits encoded at a second set of levels of the multilevel coding scheme. The communications manager 1120 may be configured as or otherwise support a means for decoding the information bits in the downlink message at the second set of levels of the multilevel coding scheme based on the control message indicating the first set of levels at which the excess bits in the downlink message are encoded.

Additionally, or alternatively, the communications manager 1120 may support wireless communication at a UE in accordance with examples as disclosed herein. For example, the communications manager 1120 may be configured as or otherwise support a means for receiving, from a base station, a control message indicating a first set of levels of a multilevel coding scheme at which to encode excess bits in an uplink message, where different levels of the multilevel coding scheme represent separately encoded streams of bits, the excess bits being in addition to information bits of the uplink message. The communications manager 1120 may be configured as or otherwise support a means for encoding the excess bits in the uplink message at the first set of levels of the multilevel coding scheme. The communications manager 1120 may be configured as or otherwise support a means for encoding information bits in the uplink message at a second set of levels of the multilevel coding scheme. The communications manager 1120 may be configured as or otherwise support a means for transmitting, the uplink message to the base station, the uplink message including the excess bits encoded at the first set of levels and also including the information bits encoded at the second set of levels.

By including or configuring the communications manager 1120 in accordance with examples as described herein, the device 1105 may support techniques for reduced processing and reduced power consumption at a receiving device. In particular, because the receiving device may be able to identify levels at which excess bits providing physical layer security are encoded in a message, the receiving device may be able to decode the message and identify the information bits in the message with minimal processing. The receiving device may also avoid having to receive retransmissions of the message since the receiving device may be more likely to successfully decode each transmission of the message.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multilevel coding for physical layer security as described herein, or the processor 1140 and the memory 1130 may be otherwise configured to perform or support such operations.

Figure 12:
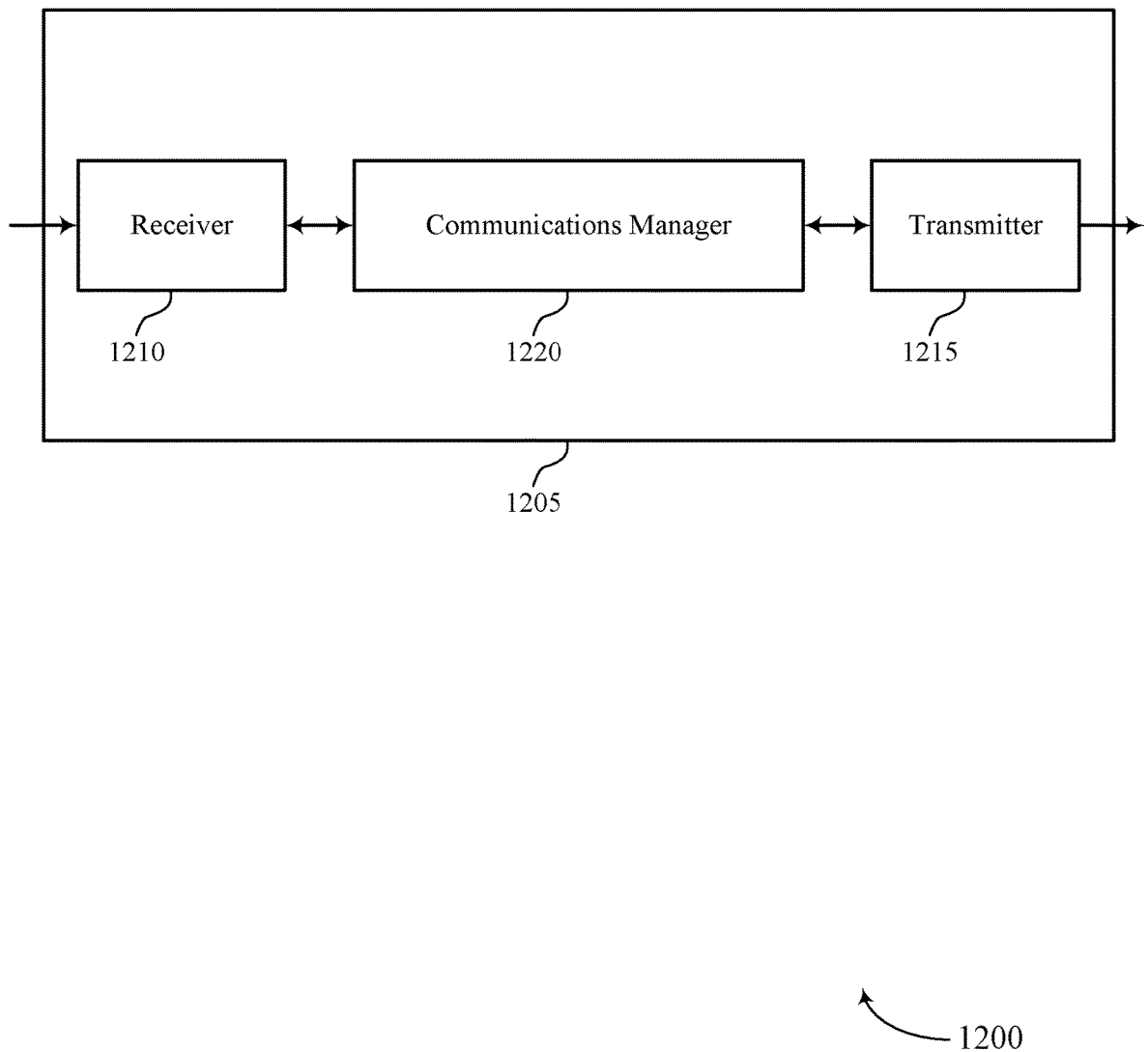
FIGS. 12 and 13 show block diagrams of devices that support multilevel coding for physical layer security in accordance with aspects of the present disclosure.

FIG. 12 shows a block diagram 1200 of a device 1205 that supports multilevel coding for physical layer security in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multilevel coding for physical layer security). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multilevel coding for physical layer security). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of multilevel coding for physical layer security as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The communications manager 1220 may be configured as or otherwise support a means for encoding the excess bits in the downlink message at the first set of levels of the multilevel coding scheme. The communications manager 1220 may be configured as or otherwise support a means for encoding information bits in the downlink message at a second set of levels of the multilevel coding scheme. The communications manager 1220 may be configured as or otherwise support a means for transmitting, the downlink message to the UE, the downlink message including the excess bits encoded at the first set of levels and also including the information bits encoded at the second set of levels.

Additionally, or alternatively, the communications manager 1220 may support wireless communication at a base station in accordance with examples as disclosed herein. For example, the communications manager 1220 may be configured as or otherwise support a means for transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message. The communications manager 1220 may be configured as or otherwise support a means for receiving, the uplink message from the UE, the uplink message including the excess bits encoded at the first set of levels of the multilevel coding scheme and also including the information bits encoded at a second set of levels of the multilevel coding scheme. The communications manager 1220 may be configured as or otherwise support a means for decoding the information bits in the uplink message at the second set of levels of the multilevel coding scheme based on the control message indicating the first set of levels at which to encode the excess bits in the uplink message.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and reduced power consumption at a receiving device. In particular, because the receiving device may be able to identify levels at which excess bits providing physical layer security are encoded in a message, the receiving device may be able to decode the message and identify the information bits in the message with minimal processing. The receiving device may also avoid having to receive retransmissions of the message since the receiving device may be more likely to successfully decode each transmission of the message.

Figure 13:
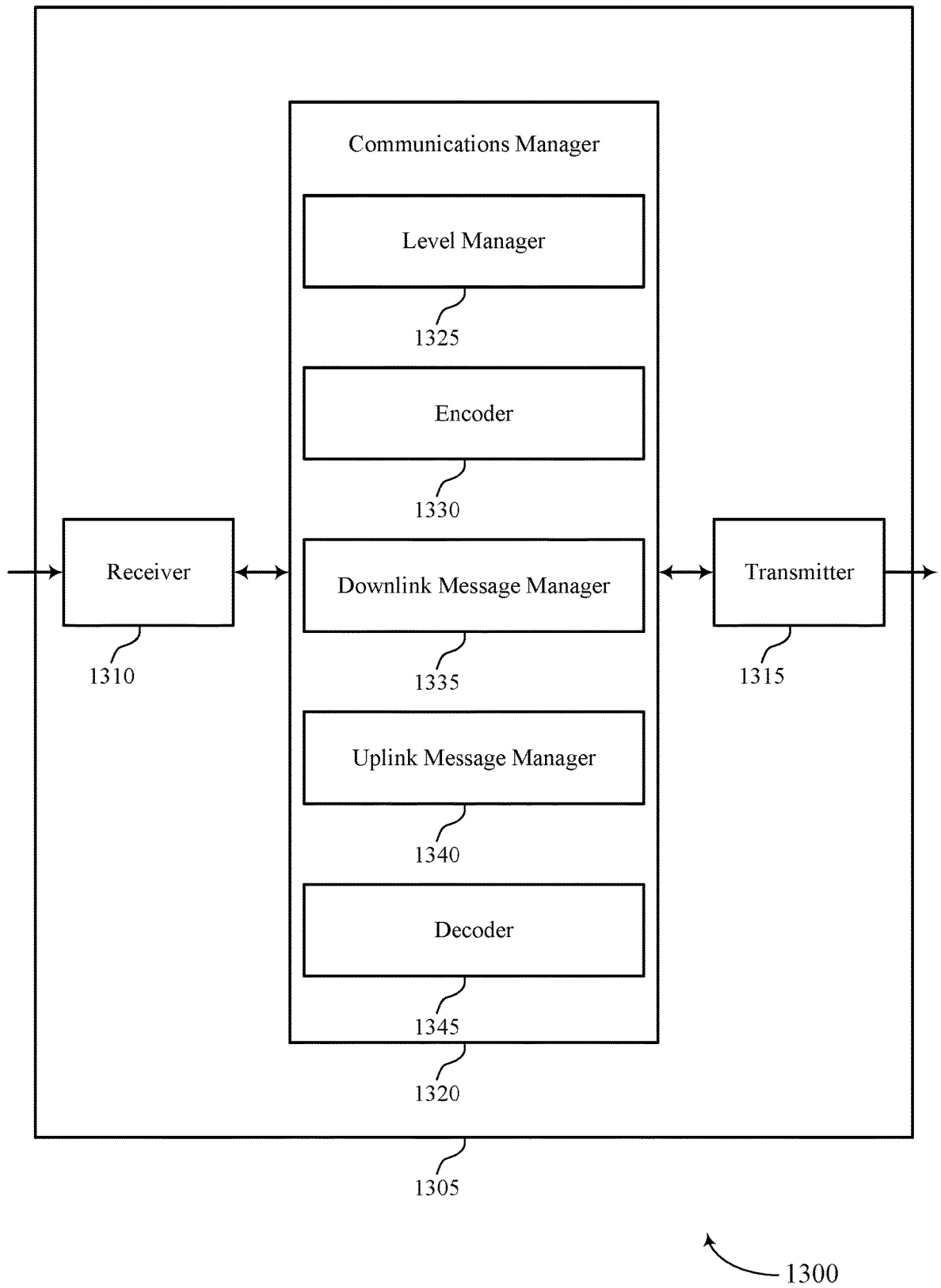

FIG. 13 shows a block diagram 1300 of a device 1305 that supports multilevel coding for physical layer security in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to multilevel coding for physical layer security). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to multilevel coding for physical layer security). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of multilevel coding for physical layer security as described herein. For example, the communications manager 1320 may include a level manager 1325, an encoder 1330, a downlink message manager 1335, an uplink message manager 1340, a decoder 1345, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The level manager 1325 may be configured as or otherwise support a means for transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The encoder 1330 may be configured as or otherwise support a means for encoding the excess bits in the downlink message at the first set of levels of the multilevel coding scheme. The encoder 1330 may be configured as or otherwise support a means for encoding information bits in the downlink message at a second set of levels of the multilevel coding scheme. The downlink message manager 1335 may be configured as or otherwise support a means for transmitting, the downlink message to the UE, the downlink message including the excess bits encoded at the first set of levels and also including the information bits encoded at the second set of levels.

Additionally, or alternatively, the communications manager 1320 may support wireless communication at a base station in accordance with examples as disclosed herein. The level manager 1325 may be configured as or otherwise support a means for transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message. The uplink message manager 1340 may be configured as or otherwise support a means for receiving, the uplink message from the UE, the uplink message including the excess bits encoded at the first set of levels of the multilevel coding scheme and also including the information bits encoded at a second set of levels of the multilevel coding scheme. The decoder 1345 may be configured as or otherwise support a means for decoding the information bits in the uplink message at the second set of levels of the multilevel coding scheme based on the control message indicating the first set of levels at which to encode the excess bits in the uplink message.

Figure 14:
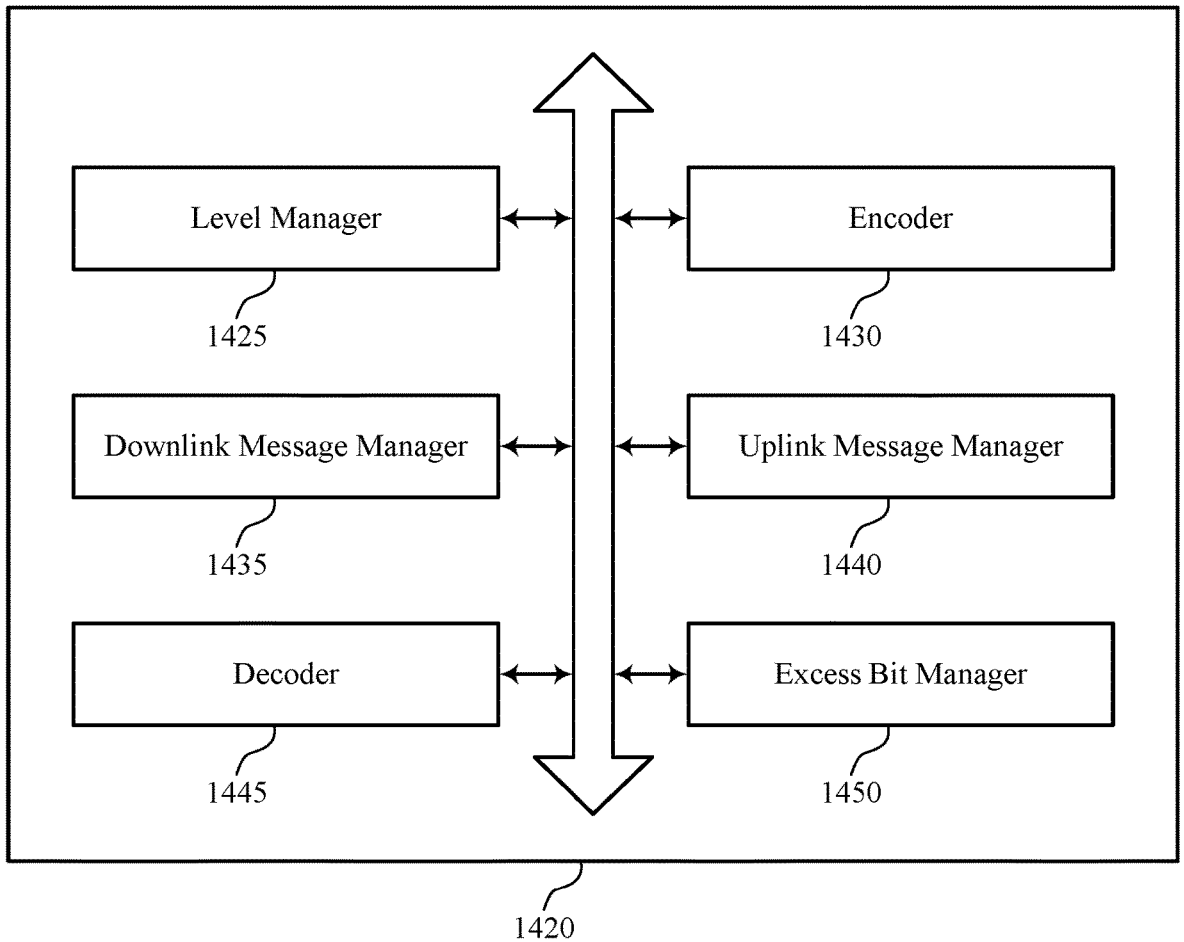
FIG. 14 shows a block diagram of a communications manager that supports multilevel coding for physical layer security in accordance with aspects of the present disclosure.

FIG. 14 shows a block diagram 1400 of a communications manager 1420 that supports multilevel coding for physical layer security in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of multilevel coding for physical layer security as described herein. For example, the communications manager 1420 may include a level manager 1425, an encoder 1430, a downlink message manager 1435, an uplink message manager 1440, a decoder 1445, an excess bit manager 1450, or any combination thereof. Each of these components may communicate, directly or indirectly, with one another (e.g., via one or more buses).

The communications manager 1420 may support wireless communication at a base station in accordance with examples as disclosed herein. The level manager 1425 may be configured as or otherwise support a means for transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The encoder 1430 may be configured as or otherwise support a means for encoding the excess bits in the downlink message at the first set of levels of the multilevel coding scheme. In some examples, the encoder 1430 may be configured as or otherwise support a means for encoding information bits in the downlink message at a second set of levels of the multilevel coding scheme. The downlink message manager 1435 may be configured as or otherwise support a means for transmitting, the downlink message to the UE, the downlink message including the excess bits encoded at the first set of levels and also including the information bits encoded at the second set of levels.

In some examples, the excess bit manager 1450 may be configured as or otherwise support a means for transmitting an indication of one or more levels of the first set of levels, the one or more levels including at least a portion of the excess bits that the UE is to decode.

In some examples, to support transmitting the indication of the one or more levels, the excess bit manager 1450 may be configured as or otherwise support a means for transmitting a radio resource control message indicating the one or more levels including the at least the portion of the excess bits for the UE to decode.

In some examples, the one or more levels of the first set of levels including the at least the portion of the excess bits for the UE to decode are based on a modulation and coding scheme used for the downlink message.

In some examples, to support transmitting the indication of the one or more levels, the excess bit manager 1450 may be configured as or otherwise support a means for transmitting a downlink control information message indicating the one or more levels including the at least the portion of the excess bits for the UE to decode.

In some examples, the excess bits in the downlink message provide physical layer security, and the physical layer security is enabled based on a modulation and coding scheme used for the downlink message.

In some examples, the excess bit manager 1450 may be configured as or otherwise support a means for generating the excess bits such that the UE is unable to regenerate the excess bits, where the excess bits include random bits.

In some examples, the excess bit manager 1450 may be configured as or otherwise support a means for identifying a seed for a random sequence to use to generate the excess bits in the downlink message. In some examples, the excess bit manager 1450 may be configured as or otherwise support a means for generating the excess bits using the identified seed for the random sequence, where the excess bits include random bits. In some examples, the excess bit manager 1450 may be configured as or otherwise support a means for transmitting, to the UE, an indication of the identified seed for the random sequence used to generate the excess bits in the downlink message.

In some examples, to support transmitting the control message, the level manager 1425 may be configured as or otherwise support a means for transmitting a radio resource control message indicating the first set of levels of the multilevel coding scheme at which the excess bits in the downlink message are to be encoded.

In some examples, the first set of levels at which the excess bits in the downlink message are to be encoded is based on a modulation and coding scheme used for the downlink message.

In some examples, to support transmitting the control message, the level manager 1425 may be configured as or otherwise support a means for transmitting a medium access control (MAC) control element (CE) indicating the first set of levels of the multilevel coding scheme at which the excess bits in the downlink message are to be encoded.

In some examples, to support transmitting the control message, the level manager 1425 may be configured as or otherwise support a means for transmitting a downlink control information message indicating the first set of levels of the multilevel coding scheme at which the excess bits in the downlink message are to be encoded.

In some examples, to support transmitting the downlink control information message, the level manager 1425 may be configured as or otherwise support a means for transmitting a bitmap in the downlink control information message indicating the first set of levels of the multilevel coding scheme at which the excess bits in the downlink message are to be encoded, where a size of the bitmap is equal to a quantity of levels of the multilevel coding scheme, and each bit in the bitmap indicates whether information bits or excess bits are to be encoded at a corresponding level.

In some examples, the level manager 1425 may be configured as or otherwise support a means for transmitting a radio resource control message indicating a set of different sets of levels at which the excess bits are to be encoded, where the downlink control information message indicates the first set of levels from among the set of multiple different sets of levels.

Additionally, or alternatively, the communications manager 1420 may support wireless communication at a base station in accordance with examples as disclosed herein. In some examples, the level manager 1425 may be configured as or otherwise support a means for transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message. The uplink message manager 1440 may be configured as or otherwise support a means for receiving, the uplink message from the UE, the uplink message including the excess bits encoded at the first set of levels of the multilevel coding scheme and also including the information bits encoded at a second set of levels of the multilevel coding scheme. The decoder 1445 may be configured as or otherwise support a means for decoding the information bits in the uplink message at the second set of levels of the multilevel coding scheme based on the control message indicating the first set of levels at which to encode the excess bits in the uplink message.

In some examples, the decoder 1445 may be configured as or otherwise support a means for decoding at least a portion of the excess bits at one or more levels of the first set of levels, where decoding the information bits is based on decoding the at least the portion of the excess bits.

In some examples, the excess bits in the uplink message provide physical layer security, and the physical layer security is enabled based on a modulation and coding scheme used for the uplink message.

In some examples, the excess bit manager 1450 may be configured as or otherwise support a means for identifying a seed for a random sequence used to generate the excess bits in the uplink message. In some examples, the excess bit manager 1450 may be configured as or otherwise support a means for generating the excess bits using the identified seed for the random sequence, where the excess bits include random bits, and where decoding the information bits is based on generating the excess bits.

In some examples, to support identifying the seed for the random sequence used to generate the excess bits in the uplink message, the excess bit manager 1450 may be configured as or otherwise support a means for receiving, from the UE, an indication of the seed for the random sequence used to generate the excess bits in the uplink message.

In some examples, to support transmitting the control message, the level manager 1425 may be configured as or otherwise support a means for transmitting a radio resource control message indicating the first set of levels of the multilevel coding scheme at which to encode the excess bits in the uplink message.

In some examples, the first set of levels at which to encode the excess bits in the uplink message is based on a modulation and coding scheme used for the uplink message.

In some examples, to support transmitting the control message, the level manager 1425 may be configured as or otherwise support a means for transmitting a medium access control (MAC) control element (CE) indicating the first set of levels of the multilevel coding scheme at which to encode the excess bits in the uplink message.

In some examples, to support transmitting the control message, the level manager 1425 may be configured as or otherwise support a means for transmitting a downlink control information message indicating the first set of levels of the multilevel coding scheme at which to encode the excess bits in the uplink message.

In some examples, to support transmitting the downlink control information message, the level manager 1425 may be configured as or otherwise support a means for transmitting a bitmap in the downlink control information message indicating the first set of levels of the multilevel coding scheme at which to encode the excess bits in the uplink message, where a size of the bitmap is equal to a quantity of levels of the multilevel coding scheme, and each bit in the bitmap indicates whether information bits or excess bits are to be encoded at a corresponding level.

In some examples, the level manager 1425 may be configured as or otherwise support a means for transmitting a radio resource control message indicating a set of different sets of levels at which to encode the excess bits, where the downlink control information message indicates the first set of levels from among the set of multiple different sets of levels.

Figure 15:
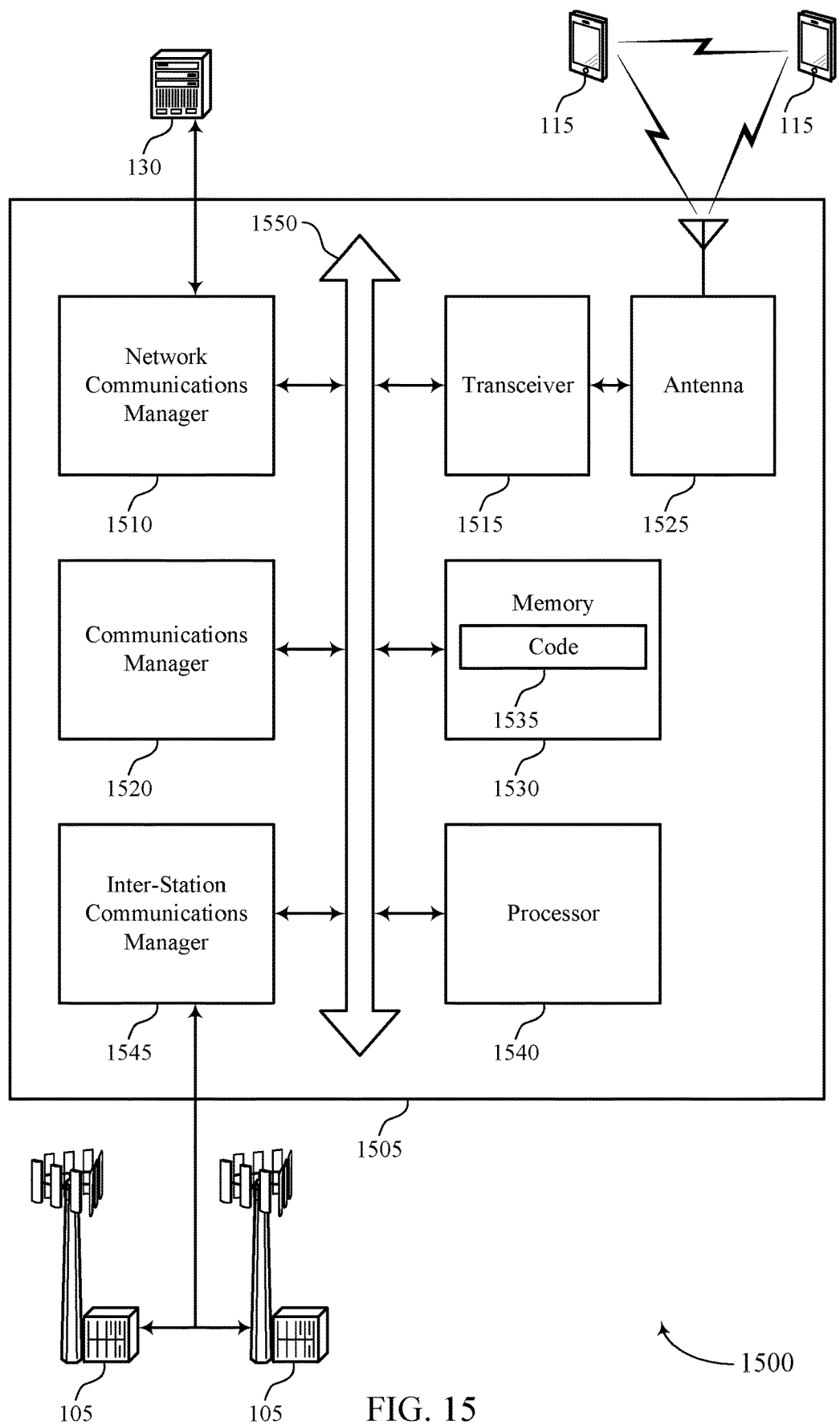
FIG. 15 shows a diagram of a system including a device that supports multilevel coding for physical layer security in accordance with aspects of the present disclosure.

FIG. 15 shows a diagram of a system 1500 including a device 1505 that supports multilevel coding for physical layer security in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting multilevel coding for physical layer security). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, a control message indicating a first set of levels of a multilevel coding scheme at which excess bits in a downlink message are to be encoded, where different levels of the multilevel coding scheme represent separately encoded streams of bits, the excess bits being in addition to information bits of the downlink message. The communications manager 1520 may be configured as or otherwise support a means for encoding the excess bits in the downlink message at the first set of levels of the multilevel coding scheme. The communications manager 1520 may be configured as or otherwise support a means for encoding information bits in the downlink message at a second set of levels of the multilevel coding scheme. The communications manager 1520 may be configured as or otherwise support a means for transmitting, the downlink message to the UE, the downlink message including the excess bits encoded at the first set of levels and also including the information bits encoded at the second set of levels.

Additionally, or alternatively, the communications manager 1520 may support wireless communication at a base station in accordance with examples as disclosed herein. For example, the communications manager 1520 may be configured as or otherwise support a means for transmitting, to a UE, a control message indicating a first set of levels of a multilevel coding scheme at which to encode excess bits in an uplink message, where different levels of the multilevel coding scheme represent separately encoded streams of bits, the excess bits being in addition to information bits of the uplink message. The communications manager 1520 may be configured as or otherwise support a means for receiving, the uplink message from the UE, the uplink message including the excess bits encoded at the first set of levels of the multilevel coding scheme and also including the information bits encoded at a second set of levels of the multilevel coding scheme. The communications manager 1520 may be configured as or otherwise support a means for decoding the information bits in the uplink message at the second set of levels of the multilevel coding scheme based on the control message indicating the first set of levels at which to encode the excess bits in the uplink message.

By including or configuring the communications manager 1520 in accordance with examples as described herein, the device 1505 may support techniques for reduced processing and reduced power consumption at a receiving device. In particular, because the receiving device may be able to identify levels at which excess bits providing physical layer security are encoded in a message, the receiving device may be able to decode the message and identify the information bits in the message with minimal processing. The receiving device may also avoid having to receive retransmissions of the message since the receiving device may be more likely to successfully decode each transmission of the message.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of multilevel coding for physical layer security as described herein, or the processor 1540 and the memory 1530 may be otherwise configured to perform or support such operations.

Figure 16:
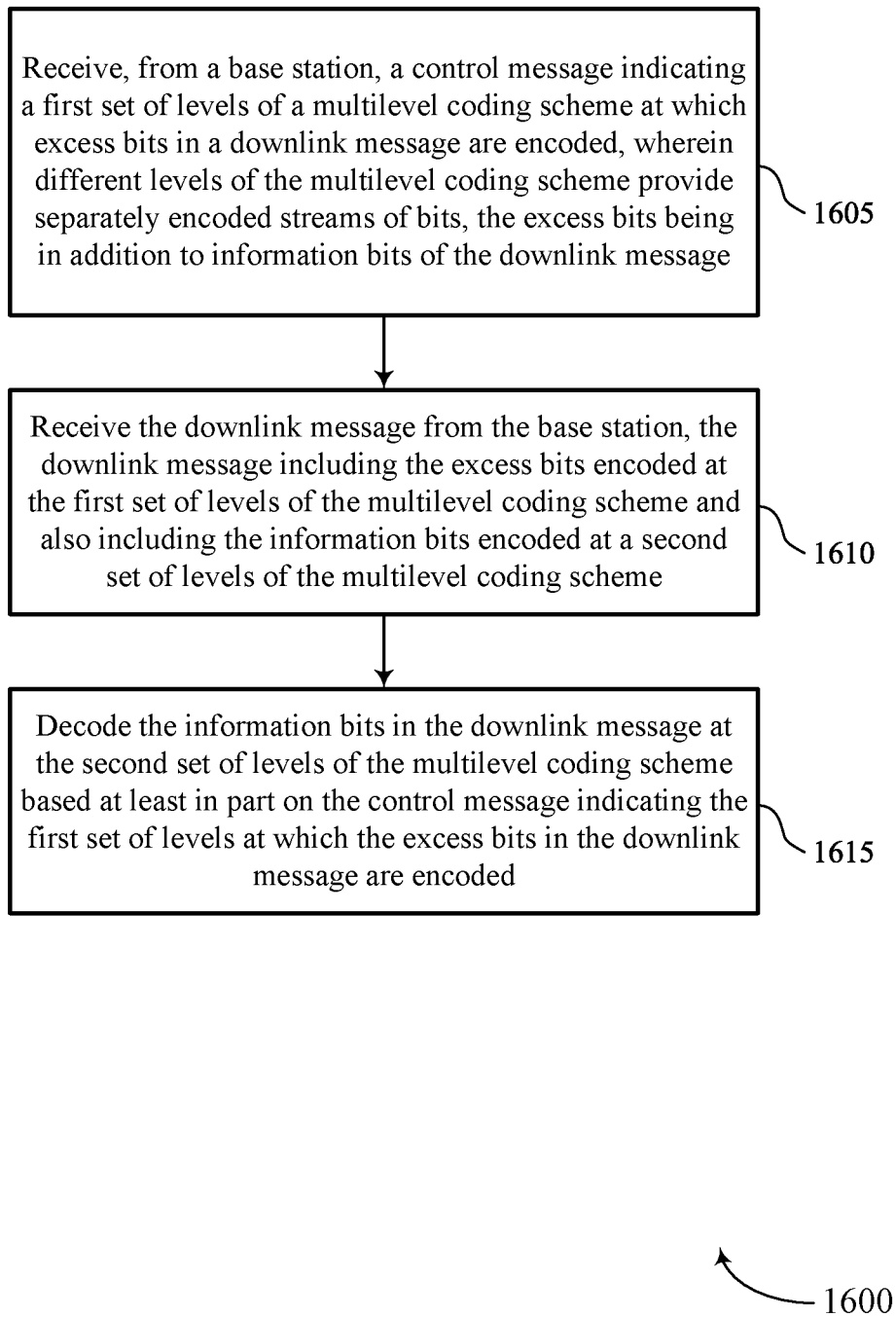
FIGS. 16 through 19 show flowcharts illustrating methods that support multilevel coding for physical layer security in accordance with aspects of the present disclosure.

FIG. 16 shows a flowchart illustrating a method 1600 that supports multilevel coding for physical layer security in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, a control message indicating a first set of levels of a multilevel coding scheme at which excess bits in a downlink message are encoded, where different levels of the multilevel coding scheme provide separately encoded streams of bits, the excess bits being in addition to information bits of the downlink message. The operations of 1605 may be performed in accordance with examples as disclosed herein. In some examples, aspects of the operations of 1605 may be performed by a level manager 1025 as described with reference to FIG. 10.

At 1610, the method may include receiving the downlink message from the base station, the downlink message including the excess bits encoded at the first set of levels of the multilevel coding scheme and also including the information bits encoded at a second set of levels of the multilevel coding scheme. The operations of 1610 may be performed in accordance with examples as disclosed herein. In some examples, aspects of the operations of 1610 may be performed by a downlink message manager 1030 as described with reference to FIG. 10.

At 1615, the method may include decoding the information bits in the downlink message at the second set of levels of the multilevel coding scheme based on the control message indicating the first set of levels at which the excess bits in the downlink message are encoded. The operations of 1615 may be performed in accordance with examples as disclosed herein. In some examples, aspects of the operations of 1615 may be performed by a decoder 1035 as described with reference to FIG. 10.

Figure 17:
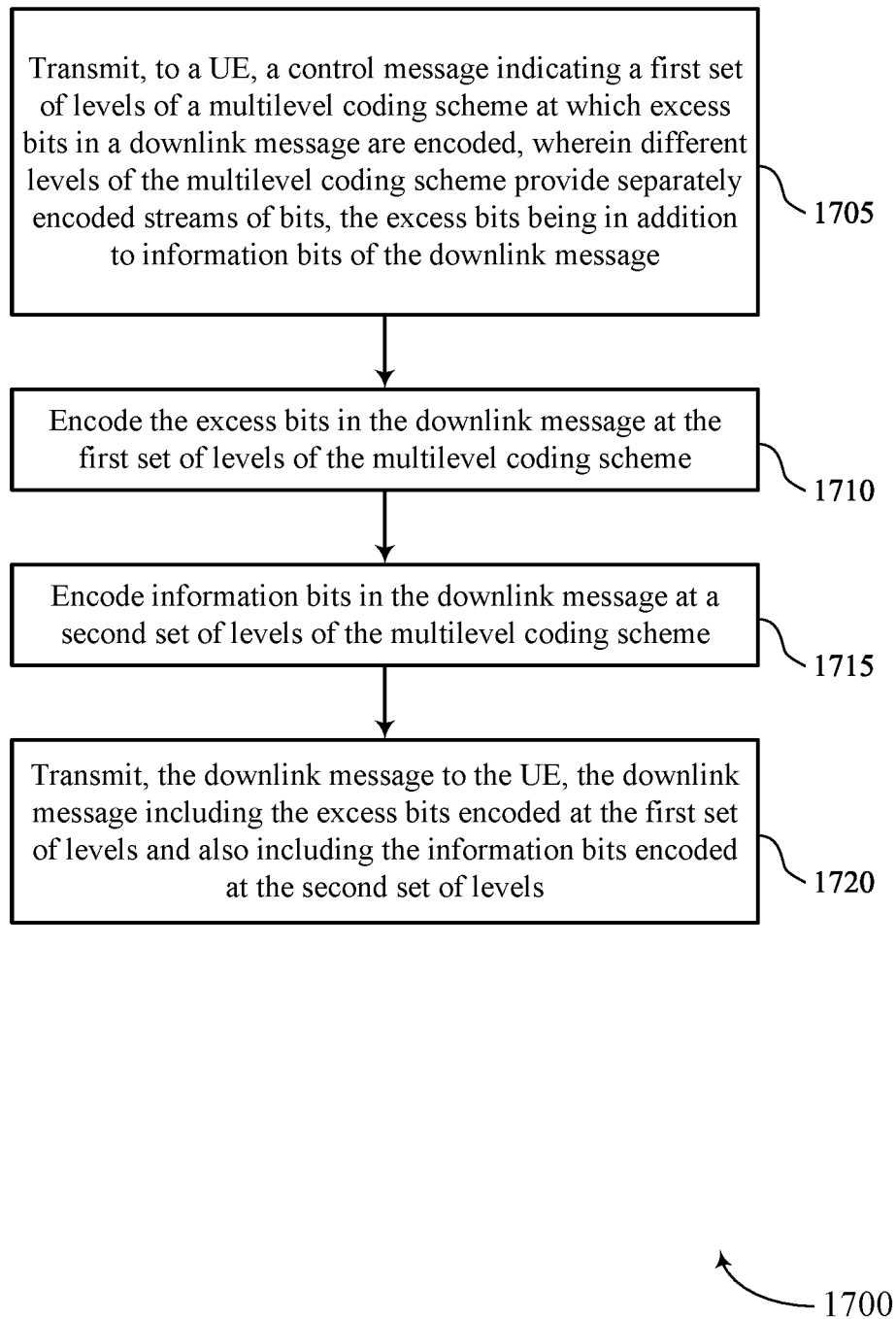

FIG. 17 shows a flowchart illustrating a method 1700 that supports multilevel coding for physical layer security in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, a control message indicating a first set of levels of a multilevel coding scheme at which excess bits in a downlink message are encoded, where different levels of the multilevel coding scheme provide separately encoded streams of bits, the excess bits being in addition to information bits of the downlink message. The operations of 1705 may be performed in accordance with examples as disclosed herein. In some examples, aspects of the operations of 1705 may be performed by a level manager 1425 as described with reference to FIG. 14.

At 1710, the method may include encoding the excess bits in the downlink message at the first set of levels of the multilevel coding scheme. The operations of 1710 may be performed in accordance with examples as disclosed herein. In some examples, aspects of the operations of 1710 may be performed by an encoder 1430 as described with reference to FIG. 14.

At 1715, the method may include encoding information bits in the downlink message at a second set of levels of the multilevel coding scheme. The operations of 1715 may be performed in accordance with examples as disclosed herein. In some examples, aspects of the operations of 1715 may be performed by an encoder 1430 as described with reference to FIG. 14.

At 1720, the method may include transmitting, the downlink message to the UE, the downlink message including the excess bits encoded at the first set of levels and also including the information bits encoded at the second set of levels. The operations of 1720 may be performed in accordance with examples as disclosed herein. In some examples, aspects of the operations of 1720 may be performed by a downlink message manager 1435 as described with reference to FIG. 14.

Figure 18:
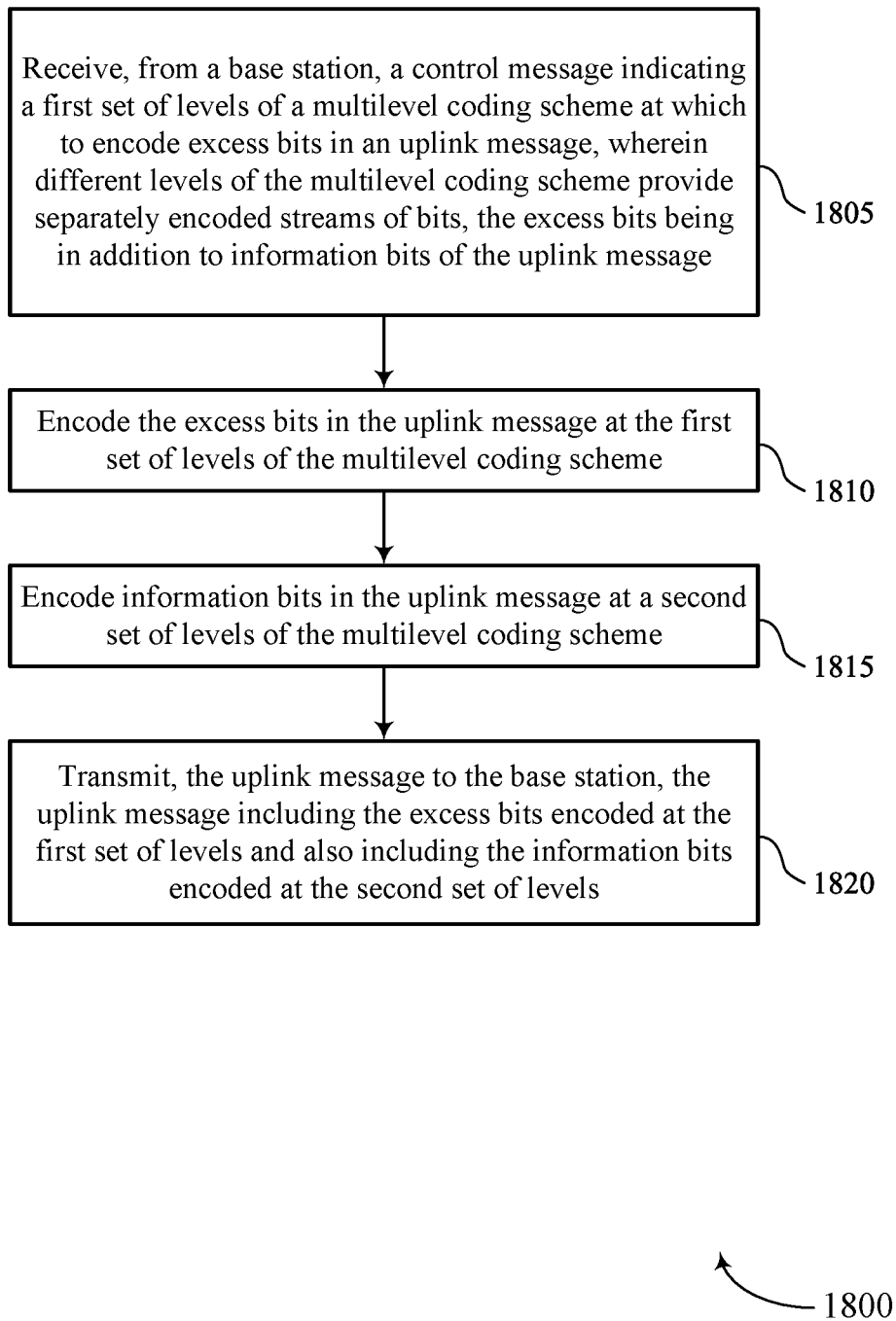

FIG. 18 shows a flowchart illustrating a method 1800 that supports multilevel coding for physical layer security in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, a control message indicating a first set of levels of a multilevel coding scheme at which to encode excess bits in an uplink message, where different levels of the multilevel coding scheme provide separately encoded streams of bits, the excess bits being in addition to information bits of the uplink message. The operations of 1805 may be performed in accordance with examples as disclosed herein. In some examples, aspects of the operations of 1805 may be performed by a level manager 1025 as described with reference to FIG. 10.

At 1810, the method may include encoding the excess bits in the uplink message at the first set of levels of the multilevel coding scheme. The operations of 1810 may be performed in accordance with examples as disclosed herein. In some examples, aspects of the operations of 1810 may be performed by an encoder 1040 as described with reference to FIG. 10.

At 1815, the method may include encoding information bits in the uplink message at a second set of levels of the multilevel coding scheme. The operations of 1815 may be performed in accordance with examples as disclosed herein. In some examples, aspects of the operations of 1815 may be performed by an encoder 1040 as described with reference to FIG. 10.

At 1820, the method may include transmitting, the uplink message to the base station, the uplink message including the excess bits encoded at the first set of levels and also including the information bits encoded at the second set of levels. The operations of 1820 may be performed in accordance with examples as disclosed herein. In some examples, aspects of the operations of 1820 may be performed by an uplink message manager 1045 as described with reference to FIG. 10.

Figure 19:
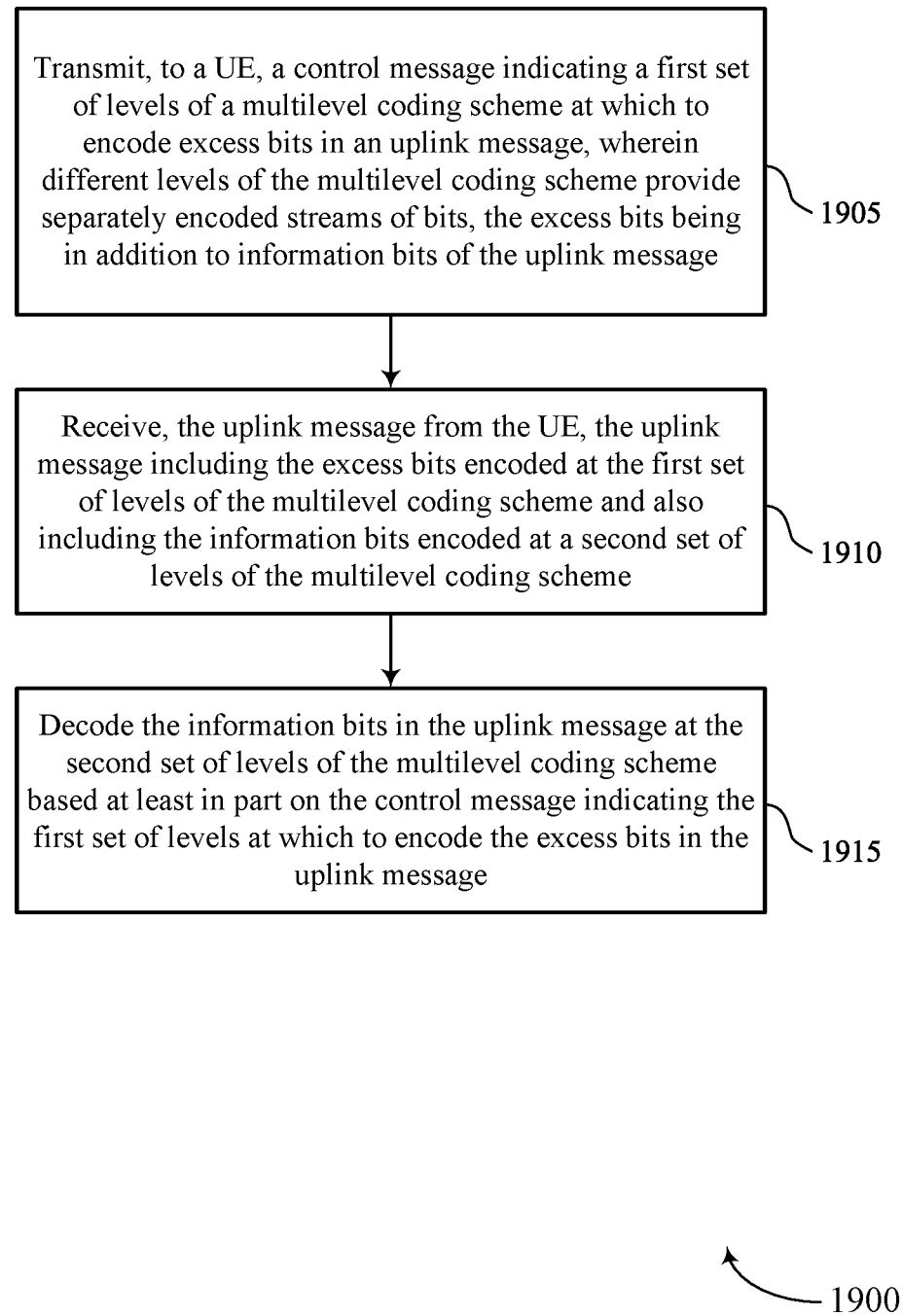

FIG. 19 shows a flowchart illustrating a method 1900 that supports multilevel coding for physical layer security in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting, to a UE, a control message indicating a first set of levels of a multilevel coding scheme at which to encode excess bits in an uplink message, where different levels of the multilevel coding scheme provide separately encoded streams of bits, the excess bits being in addition to information bits of the uplink message. The operations of 1905 may be performed in accordance with examples as disclosed herein. In some examples, aspects of the operations of 1905 may be performed by a level manager 1425 as described with reference to FIG. 14.

At 1910, the method may include receiving, the uplink message from the UE, the uplink message including the excess bits encoded at the first set of levels of the multilevel coding scheme and also including the information bits encoded at a second set of levels of the multilevel coding scheme. The operations of 1910 may be performed in accordance with examples as disclosed herein. In some examples, aspects of the operations of 1910 may be performed by an uplink message manager 1440 as described with reference to FIG. 14.

At 1915, the method may include decoding the information bits in the uplink message at the second set of levels of the multilevel coding scheme based on the control message indicating the first set of levels at which to encode the excess bits in the uplink message. The operations of 1915 may be performed in accordance with examples as disclosed herein. In some examples, aspects of the operations of 1915 may be performed by a decoder 1445 as described with reference to FIG. 14.

The following provides an overview of aspects of the present disclosure:

Aspect 1: A method for wireless communication at a UE, comprising: receiving, from a base station, a control message indicating a first set of levels of a multilevel coding scheme at which excess bits in a downlink message are to be encoded, wherein different levels of the multilevel coding scheme represent separately encoded streams of bits, the excess bits being in addition to information bits of the downlink message; receiving the downlink message from the base station, the downlink message including the excess bits encoded at the first set of levels of the multilevel coding scheme and also including the information bits encoded at a second set of levels of the multilevel coding scheme; and decoding the information bits in the downlink message at the second set of levels of the multilevel coding scheme based at least in part on the control message indicating the first set of levels at which the excess bits in the downlink message are encoded.

Aspect 2: The method of aspect 1, further comprising: receiving an indication of one or more levels of the first set of levels, the one or more levels comprising at least a portion of the excess bits that the UE is to decode; and decoding the at least the portion of the excess bits at the one or more levels based at least in part on the indication of the one or more levels, wherein decoding the information bits is based at least in part on decoding the at least the portion of the excess bits.

Aspect 3: The method of aspect 2, wherein receiving the indication of the one or more levels comprises: receiving a radio resource control message indicating the one or more levels comprising the at least the portion of the excess bits for the UE to decode.

Aspect 4: The method of aspect 3, wherein the one or more levels of the first set of levels comprising the at least the portion of the excess bits for the UE to decode are based at least in part on a modulation and coding scheme used for the downlink message.

Aspect 5: The method of any of aspects 2 through 4, wherein receiving the indication of the one or more levels comprises: receiving a downlink control information message indicating the one or more levels comprising the at least the portion of the excess bits for the UE to decode.

Aspect 6: The method of any of aspects 1 through 5, wherein the excess bits in the downlink message provide physical layer security, and the physical layer security is enabled based at least in part on a modulation and coding scheme used for the downlink message.

Aspect 7: The method of any of aspects 1 through 6, further comprising: identifying a seed for a random sequence used to generate the excess bits in the downlink message; and generating the excess bits using the identified seed for the random sequence, wherein the excess bits comprise random bits, and wherein decoding the information bits is based at least in part on generating the random bits.

Aspect 8: The method of aspect 7, wherein identifying the seed for the random sequence used to generate the excess bits in the downlink message comprises: receiving, from the base station, an indication of the seed for the random sequence used to generate the excess bits in the downlink message.

Aspect 9: The method of any of aspects 1 through 8, wherein receiving the control message comprises: receiving a radio resource control message indicating the first set of levels of the multilevel coding scheme at which the excess bits in the downlink message are to be encoded.

Aspect 10: The method of aspect 9, wherein the first set of levels at which the excess bits in the downlink message are to be encoded is based at least in part on a modulation and coding scheme used for the downlink message.

Aspect 11: The method of any of aspects 1 through 10, wherein receiving the control message comprises: receiving a medium access control (MAC) control element (CE) indicating the first set of levels of the multilevel coding scheme at which the excess bits in the downlink message are to be encoded.

Aspect 12: The method of any of aspects 1 through 11, wherein receiving the control message comprises: receiving a downlink control information message indicating the first set of levels of the multilevel coding scheme at which the excess bits in the downlink message are to be encoded.

Aspect 13: The method of aspect 12, wherein receiving the downlink control information message comprises: receiving a bitmap in the downlink control information message indicating the first set of levels of the multilevel coding scheme at which the excess bits in the downlink message are to be encoded, wherein a size of the bitmap is equal to a quantity of levels of the multilevel coding scheme, and each bit in the bitmap indicates whether information bits or excess bits are to be encoded at a corresponding level.

Aspect 14: The method of any of aspects 12 through 13, further comprising: receiving a radio resource control message indicating a plurality of different sets of levels at which the excess bits are to be encoded, wherein the downlink control information message indicates the first set of levels from among the plurality of different sets of levels.

Aspect 15: A method for wireless communication at a base station, comprising: transmitting, to a UE, a control message indicating a first set of levels of a multilevel coding scheme at which excess bits in a downlink message are to be encoded, wherein different levels of the multilevel coding scheme represent separately encoded streams of bits, the excess bits being in addition to information bits of the downlink message; encoding the excess bits in the downlink message at the first set of levels of the multilevel coding scheme; encoding information bits in the downlink message at a second set of levels of the multilevel coding scheme; and transmitting, the downlink message to the UE, the downlink message including the excess bits encoded at the first set of levels and also including the information bits encoded at the second set of levels.

Aspect 16: The method of aspect 15, further comprising: transmitting an indication of one or more levels of the first set of levels, the one or more levels comprising at least a portion of the excess bits that the UE is to decode.

Aspect 17: The method of aspect 16, wherein transmitting the indication of the one or more levels comprises: transmitting a radio resource control message indicating the one or more levels comprising the at least the portion of the excess bits for the UE to decode.

Aspect 18: The method of aspect 17, wherein the one or more levels of the first set of levels comprising the at least the portion of the excess bits for the UE to decode are based at least in part on a modulation and coding scheme used for the downlink message.

Aspect 19: The method of any of aspects 16 through 18, wherein transmitting the indication of the one or more levels comprises: transmitting a downlink control information message indicating the one or more levels comprising the at least the portion of the excess bits for the UE to decode.

Aspect 20: The method of any of aspects 15 through 19, wherein the excess bits in the downlink message provide physical layer security, and the physical layer security is enabled based at least in part on a modulation and coding scheme used for the downlink message.

Aspect 21: The method of any of aspects 15 through 20, further comprising: generating the excess bits such that the UE is unable to regenerate the excess bits, wherein the excess bits include random bits.

Aspect 22: The method of any of aspects 15 through 21, further comprising: identifying a seed for a random sequence to use to generate the excess bits in the downlink message; generating the excess bits using the identified seed for the random sequence, wherein the excess bits include random bits; and transmitting, to the UE, an indication of the identified seed for the random sequence used to generate the excess bits in the downlink message.

Aspect 23: The method of any of aspects 15 through 22, wherein transmitting the control message comprises: transmitting a radio resource control message indicating the first set of levels of the multilevel coding scheme at which the excess bits in the downlink message are to be encoded.

Aspect 24: The method of aspect 23, wherein the first set of levels at which the excess bits in the downlink message are to be encoded is based at least in part on a modulation and coding scheme used for the downlink message.

Aspect 25: The method of any of aspects 15 through 24, wherein transmitting the control message comprises: transmitting a medium access control (MAC) control element (CE) indicating the first set of levels of the multilevel coding scheme at which the excess bits in the downlink message are to be encoded.

Aspect 26: The method of any of aspects 15 through 25, wherein transmitting the control message comprises: transmitting a downlink control information message indicating the first set of levels of the multilevel coding scheme at which the excess bits in the downlink message are to be encoded.

Aspect 27: The method of aspect 26, wherein transmitting the downlink control information message comprises: transmitting a bitmap in the downlink control information message indicating the first set of levels of the multilevel coding scheme at which the excess bits in the downlink message are to be encoded, wherein a size of the bitmap is equal to a quantity of levels of the multilevel coding scheme, and each bit in the bitmap indicates whether information bits or excess bits are to be encoded at a corresponding level.

Aspect 28: The method of any of aspects 26 through 27, further comprising: transmitting a radio resource control message indicating a plurality of different sets of levels at which the excess bits are to be encoded, wherein the downlink control information message indicates the first set of levels from among the plurality of different sets of levels.

Aspect 29: A method for wireless communication at a UE, comprising: receiving, from a base station, a control message indicating a first set of levels of a multilevel coding scheme at which to encode excess bits in an uplink message, wherein different levels of the multilevel coding scheme represent separately encoded streams of bits, the excess bits being in addition to information bits of the uplink message; encoding the excess bits in the uplink message at the first set of levels of the multilevel coding scheme; encoding information bits in the uplink message at a second set of levels of the multilevel coding scheme; and transmitting, the uplink message to the base station, the uplink message including the excess bits encoded at the first set of levels and also including the information bits encoded at the second set of levels.

Aspect 30: The method of aspect 29, wherein the excess bits in the uplink message provide physical layer security, and the physical layer security is enabled based at least in part on a modulation and coding scheme used for the uplink message.

Aspect 31: The method of any of aspects 29 through 30, further comprising: generating the excess bits such that the base station is unable to regenerate the excess bits, wherein the excess bits include random bits.

Aspect 32: The method of any of aspects 29 through 31, further comprising: identifying a seed for a random sequence to use to generate the excess bits in the uplink message; generating the excess bits using the identified seed for the random sequence, wherein the excess bits include random bits; and transmitting, to the base station, an indication of the identified seed for the random sequence used to generate the excess bits in the uplink message.

Aspect 33: The method of any of aspects 29 through 32, wherein receiving the control message comprises: receiving a radio resource control message indicating the first set of levels of the multilevel coding scheme at which to encode the excess bits in the uplink message.

Aspect 34: The method of aspect 33, wherein the first set of levels at which to encode the excess bits in the uplink message is based at least in part on a modulation and coding scheme used for the uplink message.

Aspect 35: The method of any of aspects 29 through 34, wherein receiving the control message comprises: receiving a medium access control (MAC) control element (CE) indicating the first set of levels of the multilevel coding scheme at which to encode the excess bits in the uplink message.

Aspect 36: The method of any of aspects 29 through 35, wherein receiving the control message comprises: receiving a downlink control information message indicating the first set of levels of the multilevel coding scheme at which to encode the excess bits in the uplink message.

Aspect 37: The method of aspect 36, wherein receiving the downlink control information message comprises: receiving a bitmap in the downlink control information message indicating the first set of levels of the multilevel coding scheme at which to encode the excess bits in the uplink message, wherein a size of the bitmap is equal to a quantity of levels of the multilevel coding scheme, and each bit in the bitmap indicates whether information bits or excess bits are to be encoded at a corresponding level.

Aspect 38: The method of any of aspects 36 through 37, further comprising: receiving a radio resource control message indicating a plurality of different sets of levels at which to encode the excess bits, wherein the downlink control information message indicates the first set of levels from among the plurality of different sets of levels.

Aspect 39: A method for wireless communication at a base station, comprising: transmitting, to a UE, a control message indicating a first set of levels of a multilevel coding scheme at which to encode excess bits in an uplink message, wherein different levels of the multilevel coding scheme represent separately encoded streams of bits, the excess bits being in addition to information bits of the uplink message; receiving, the uplink message from the UE, the uplink message including the excess bits encoded at the first set of levels of the multilevel coding scheme and also including the information bits encoded at a second set of levels of the multilevel coding scheme; and decoding the information bits in the uplink message at the second set of levels of the multilevel coding scheme based at least in part on the control message indicating the first set of levels at which to encode the excess bits in the uplink message.

Aspect 40: The method of aspect 39, further comprising: decoding at least a portion of the excess bits at one or more levels of the first set of levels, wherein decoding the information bits is based at least in part on decoding the at least the portion of the excess bits.

Aspect 41: The method of any of aspects 39 through 40, wherein the excess bits in the uplink message provide physical layer security, and the physical layer security is enabled based at least in part on a modulation and coding scheme used for the uplink message.

Aspect 42: The method of any of aspects 39 through 41, further comprising: identifying a seed for a random sequence used to generate the excess bits in the uplink message; and generating the excess bits using the identified seed for the random sequence, wherein the excess bits include random bits, and wherein decoding the information bits is based at least in part on generating the excess bits.

Aspect 43: The method of aspect 42, wherein identifying the seed for the random sequence used to generate the excess bits in the uplink message comprises: receiving, from the UE, an indication of the seed for the random sequence used to generate the excess bits in the uplink message.

Aspect 44: The method of any of aspects 39 through 43, wherein transmitting the control message comprises: transmitting a radio resource control message indicating the first set of levels of the multilevel coding scheme at which to encode the excess bits in the uplink message.

Aspect 45: The method of aspect 44, wherein the first set of levels at which to encode the excess bits in the uplink message is based at least in part on a modulation and coding scheme used for the uplink message.

Aspect 46: The method of any of aspects 39 through 45, wherein transmitting the control message comprises: transmitting a medium access control (MAC) control element (CE) indicating the first set of levels of the multilevel coding scheme at which to encode the excess bits in the uplink message.

Aspect 47: The method of any of aspects 39 through 46, wherein transmitting the control message comprises: transmitting a downlink control information message indicating the first set of levels of the multilevel coding scheme at which to encode the excess bits in the uplink message.

Aspect 48: The method of aspect 47, wherein transmitting the downlink control information message comprises: transmitting a bitmap in the downlink control information message indicating the first set of levels of the multilevel coding scheme at which to encode the excess bits in the uplink message, wherein a size of the bitmap is equal to a quantity of levels of the multilevel coding scheme, and each bit in the bitmap indicates whether information bits or excess bits are to be encoded at a corresponding level.

Aspect 49: The method of any of aspects 47 through 48, further comprising: transmitting a radio resource control message indicating a plurality of different sets of levels at which to encode the excess bits, wherein the downlink control information message indicates the first set of levels from among the plurality of different sets of levels.

Aspect 50: An apparatus for wireless communication at a UE, comprising a processor; memory coupled with the processor; and instructions stored in the memory and executable by the processor to cause the apparatus to perform a method of any of aspects 1 through 14.

Aspect 51: An apparatus for wireless communication at a UE, comprising at least one means for performing a method of any of aspects 1 through 14.

Aspect 52: A non-transitory computer-readable medium storing code for wireless communication at a UE, the code comprising instructions executable by a processor to perform a method of any of aspects 1 through 14.

Aspect 53: An apparatus for wireless communication at a base station, comprising a processor; memory coupled with the processor; and instructions stored in the memory and executable by the processor to cause the apparatus to perform a method of any of aspects 15 through 28.

Aspect 54: An apparatus for wireless communication at a base station, comprising at least one means for performing a method of any of aspects 15 through 28.

Aspect 55: A non-transitory computer-readable medium storing code for wireless communication at a base station, the code comprising instructions executable by a processor to perform a method of any of aspects 15 through 28.

Aspect 56: An apparatus for wireless communication at a UE, comprising a processor; memory coupled with the processor; and instructions stored in the memory and executable by the processor to cause the apparatus to perform a method of any of aspects 29 through 38.

Aspect 57: An apparatus for wireless communication at a UE, comprising at least one means for performing a method of any of aspects 29 through 38.

Aspect 58: A non-transitory computer-readable medium storing code for wireless communication at a UE, the code comprising instructions executable by a processor to perform a method of any of aspects 29 through 38.

Aspect 59: An apparatus for wireless communication at a base station, comprising a processor; memory coupled with the processor; and instructions stored in the memory and executable by the processor to cause the apparatus to perform a method of any of aspects 39 through 49.

Aspect 60: An apparatus for wireless communication at a base station, comprising at least one means for performing a method of any of aspects 39 through 49.

Aspect 61: A non-transitory computer-readable medium storing code for wireless communication at a base station, the code comprising instructions executable by a processor to perform a method of any of aspects 39 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a network entity, a control message indicating a first set of levels of a multilevel coding scheme at which excess bits in a downlink message are encoded, wherein the multilevel coding scheme comprises a physical layer procedure, and wherein different levels of the multilevel coding scheme provide separately encoded streams of bits, the excess bits being in addition to information bits of the downlink message;
    receiving the downlink message from the network entity, the downlink message including the excess bits encoded at the first set of levels of the multilevel coding scheme and also including the information bits encoded at a second set of levels of the multilevel coding scheme; and
    decoding the information bits in the downlink message at the second set of levels of the multilevel coding scheme based at least in part on the control message indicating the first set of levels at which the excess bits in the downlink message are encoded.

2. The method of claim 1, further comprising:
    receiving an indication of one or more levels of the first set of levels; and
    decoding at least a portion of the excess bits at the one or more levels based at least in part on the indication of the one or more levels, wherein decoding the information bits is based at least in part on decoding the at least the portion of the excess bits.

3. The method of claim 2, wherein receiving the indication of the one or more levels comprises:
    receiving a radio resource control message indicating the one or more levels.

4. The method of claim 3, wherein the one or more levels of the first set of levels are based at least in part on a modulation and coding scheme used for the downlink message.

5. The method of claim 2, wherein receiving the indication of the one or more levels comprises:
    receiving a downlink control information message indicating the one or more levels.

6. The method of claim 1, wherein the excess bits in the downlink message provide physical layer security, and the physical layer security is enabled based at least in part on a modulation and coding scheme used for the downlink message.

7. The method of claim 1, further comprising:
    identifying a seed for a random sequence used to generate the excess bits in the downlink message; and
    generating the excess bits using the identified seed for the random sequence, wherein the excess bits comprise random bits, and wherein decoding the information bits is based at least in part on generating the random bits.

8. The method of claim 7, wherein identifying the seed for the random sequence used to generate the excess bits in the downlink message comprises:
    receiving, from the network entity, an indication of the seed for the random sequence used to generate the excess bits in the downlink message.

9. The method of claim 1, wherein receiving the control message comprises:
    receiving a radio resource control message indicating the first set of levels of the multilevel coding scheme at which the excess bits in the downlink message are encoded.

10. The method of claim 9, wherein the first set of levels at which the excess bits in the downlink message are encoded is selected based at least in part on a modulation and coding scheme used for the downlink message.

11. The method of claim 1, wherein receiving the control message comprises:
    receiving a medium access control (MAC) control element (CE) indicating the first set of levels of the multilevel coding scheme at which the excess bits in the downlink message are encoded.

12. The method of claim 1, wherein receiving the control message comprises:
    receiving a downlink control information message indicating the first set of levels of the multilevel coding scheme at which the excess bits in the downlink message are encoded.

13. The method of claim 12, wherein receiving the downlink control information message comprises:
    receiving a bitmap in the downlink control information message indicating the first set of levels of the multilevel coding scheme at which the excess bits in the downlink message are encoded, wherein a size of the bitmap is equal to a quantity of levels of the multilevel coding scheme, and each bit in the bitmap indicates whether information bits or excess bits are to be encoded at a corresponding level.

14. The method of claim 12, further comprising:
receiving a radio resource control message indicating a plurality of different sets of levels at which the excess bits are encoded, wherein the downlink control information message indicates the first set of levels from among the plurality of different sets of levels.

15. A method for wireless communication at a user equipment (UE), comprising:
receiving, from a network entity, a control message indicating a first set of levels of a multilevel coding scheme at which to encode excess bits in an uplink message, wherein the multilevel coding scheme comprises a physical layer procedure, and wherein different levels of the multilevel coding scheme provide separately encoded streams of bits, the excess bits being in addition to information bits of the uplink message;
encoding the excess bits in the uplink message at the first set of levels of the multilevel coding scheme;
encoding the information bits in the uplink message at a second set of levels of the multilevel coding scheme; and
transmitting the uplink message to the network entity, the uplink message including the excess bits encoded at the first set of levels and also including the information bits encoded at the second set of levels.

16. The method of claim 15, wherein the excess bits in the uplink message provide physical layer security, and the physical layer security is enabled based at least in part on a modulation and coding scheme used for the uplink message.

17. The method of claim 15, further comprising:
generating the excess bits such that the network entity is unable to regenerate the excess bits, wherein the excess bits include random bits.

18. The method of claim 15, further comprising:
identifying a seed for a random sequence to use to generate the excess bits in the uplink message;
generating the excess bits using the identified seed for the random sequence, wherein the excess bits include random bits; and
transmitting, to the network entity, an indication of the identified seed for the random sequence used to generate the excess bits in the uplink message.

19. The method of claim 15, wherein receiving the control message comprises:
receiving a radio resource control message indicating the first set of levels of the multilevel coding scheme at which to encode the excess bits in the uplink message.

20. The method of claim 19, wherein the first set of levels at which to encode the excess bits in the uplink message is selected based at least in part on a modulation and coding scheme used for the uplink message.

21. The method of claim 15, wherein receiving the control message comprises:
receiving a medium access control (MAC) control element (CE) indicating the first set of levels of the multilevel coding scheme at which to encode the excess bits in the uplink message.

22. The method of claim 15, wherein receiving the control message comprises:
receiving a downlink control information message indicating the first set of levels of the multilevel coding scheme at which to encode the excess bits in the uplink message.

23. The method of claim 22, wherein receiving the downlink control information message comprises:
receiving a bitmap in the downlink control information message indicating the first set of levels of the multilevel coding scheme at which to encode the excess bits in the uplink message, wherein a size of the bitmap is equal to a quantity of levels of the multilevel coding scheme, and each bit in the bitmap indicates whether information bits or excess bits are to be encoded at a corresponding level.

24. The method of claim 22, further comprising:
receiving a radio resource control message indicating a plurality of different sets of levels at which to encode the excess bits, wherein the downlink control information message indicates the first set of levels from among the plurality of different sets of levels.

25. An apparatus for wireless communication at a user equipment (UE), comprising:
a processor;
memory coupled with the processor; and
instructions stored in the memory and executable by the processor to cause the apparatus to:
receive, from a network entity, a control message indicating a first set of levels of a multilevel coding scheme at which excess bits in a downlink message are encoded, wherein the multilevel coding scheme comprises a physical layer procedure, and wherein different levels of the multilevel coding scheme provide separately encoded streams of bits, the excess bits being in addition to information bits of the downlink message;
receive the downlink message from the network entity, the downlink message including the excess bits encoded at the first set of levels of the multilevel coding scheme and also including the information bits encoded at a second set of levels of the multilevel coding scheme; and
decode the information bits in the downlink message at the second set of levels of the multilevel coding scheme based at least in part on the control message indicating the first set of levels at which the excess bits in the downlink message are encoded.

26. The apparatus of claim 25, wherein the instructions are further executable by the processor to cause the apparatus to:
receive an indication of one or more levels of the first set of levels; and
decode at least a portion of the excess bits at the one or more levels based at least in part on the indication of the one or more levels, wherein decoding the information bits is based at least in part on decoding the at least the portion of the excess bits.

27. The apparatus of claim 25, wherein the instructions are further executable by the processor to cause the apparatus to:
identify a seed for a random sequence used to generate the excess bits in the downlink message; and
generate the excess bits using the identified seed for the random sequence, wherein the excess bits comprise random bits, and wherein decoding the information bits is based at least in part on generating the random bits.

28. An apparatus for wireless communication at a user equipment (UE), comprising:
a processor;
memory coupled with the processor; and
instructions stored in the memory and executable by the processor to cause the apparatus to:
receive, from a network entity, a control message indicating a first set of levels of a multilevel coding scheme at which to encode excess bits in an uplink message, wherein the multilevel coding scheme comprises a physical layer procedure, and wherein different levels of the multilevel coding scheme provide separately encoded streams of bits, the excess bits being in addition to information bits of the uplink message;

encode the excess bits in the uplink message at the first set of levels of the multilevel coding scheme;

encode the information bits in the uplink message at a second set of levels of the multilevel coding scheme; and transmit, the uplink message to the network entity, the uplink message including the excess bits encoded at the first set of levels and also including the information bits encoded at the second set of levels.

29. The apparatus of claim 28, wherein the instructions are further executable by the processor to cause the apparatus to:

generate the excess bits such that the network entity is unable to regenerate the excess bits, wherein the excess bits include random bits.

30. The apparatus of claim 28, wherein the instructions are further executable by the processor to cause the apparatus to:

identify a seed for a random sequence to use to generate the excess bits in the uplink message;

generate the excess bits using the identified seed for the random sequence, wherein the excess bits include random bits; and transmit, to the network entity, an indication of the identified seed for the random sequence used to generate the excess bits in the uplink message.

* * * * *